US010362059B2

(12) United States Patent
Handa et al.

(10) Patent No.: US 10,362,059 B2
(45) Date of Patent: Jul. 23, 2019

(54) PROXY SERVERS WITHIN COMPUTER SUBNETWORKS

(71) Applicant: Oracle International Corporation, Redwood Shores, CA (US)

(72) Inventors: Nitin Handa, Foster City, CA (US); Nickolas Kavantzas, Emerald Hills, CA (US); Rohit Srivastava, Noida (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/696,186

(22) Filed: Apr. 24, 2015

(65) Prior Publication Data

US 2016/0088022 A1  Mar. 24, 2016

Related U.S. Application Data

(60) Provisional application No. 62/054,613, filed on Sep. 24, 2014.

(51) Int. Cl.
*H04L 29/06* (2006.01)
*H04L 29/08* (2006.01)
(Continued)

(52) U.S. Cl.
CPC ............ *H04L 63/20* (2013.01); *G06F 16/957* (2019.01); *G06F 16/972* (2019.01); *H04L 41/06* (2013.01);
(Continued)

(58) Field of Classification Search
CPC . H04L 63/20; H04L 63/0209; H04L 63/0281; H04L 63/083; H04L 63/105;
(Continued)

(56) References Cited

U.S. PATENT DOCUMENTS 8,095,670 B2   1/2012  Brown et al.
8,472,987 B2   6/2013  Bhatnagar
(Continued)

FOREIGN PATENT DOCUMENTS

CN   106575305   4/2017
CN   106716404   5/2017
(Continued)

OTHER PUBLICATIONS

Saini, Kulbir—Squid Proxy Server 3.1, 2011.*
(Continued)

*Primary Examiner* — Mahfuzur Rahman
*Assistant Examiner* — Richard W Cruz-Franqui
(74) *Attorney, Agent, or Firm* — Kilpatrick Townsend & Stockton, LLP

(57) ABSTRACT

Embodiments of the invention include techniques for processing messages transmitted between computer networks. In some embodiments, messages such as requests and responses for various types of web services, applications, and other web content may be transmitted between multiple computer networks. One or more intermediary devices or applications, such as a proxy server implemented within a physical or logical subnetwork, may receive, process, and transmit the messages between the communication endpoints. In some embodiments, a proxy server may be configured to operate within a subnetwork of an internal computer network, exposing various web applications and/or services of the internal computer network to external computer networks. Such a proxy server may select specific policies for processing messages based on various message characteristics and the current point in a predetermined processing flow for the message. After selecting the specific policies to be applied to the message, the proxy server may (Continued)

process the message in accordance with the policies and forward the message to its intended destination.

20 Claims, 13 Drawing Sheets

(51) Int. Cl.
  *G06F 16/957* (2019.01)
  *H04L 12/24* (2006.01)
  *G06F 16/958* (2019.01)
(52) U.S. Cl.
  CPC ...... *H04L 63/0209* (2013.01); *H04L 63/0281* (2013.01); *H04L 63/105* (2013.01); *H04L 65/105* (2013.01); *H04L 67/02* (2013.01); *H04L 67/28* (2013.01); *H04L 67/2823* (2013.01); *H04L 41/0893* (2013.01); *H04L 63/083* (2013.01)
(58) Field of Classification Search
  CPC ....... H04L 65/105; H04L 67/02; H04L 67/28; H04L 67/2823; G06F 17/30899
  See application file for complete search history.

(56) References Cited

U.S. PATENT DOCUMENTS

| | | | |
|---|---|---|---|
| 8,856,735 B2 | 10/2014 | Nimashakavi et al. | |
| 9,189,244 B2 | 11/2015 | Mcmahon et al. | |
| 9,648,043 B2 | 5/2017 | Yamuna et al. | |
| 2002/0157019 A1* | 10/2002 | Kadyk | H04L 63/0281 726/4 |
| 2003/0037097 A1* | 2/2003 | Meyer | G06F 16/951 709/202 |
| 2003/0065711 A1* | 4/2003 | Acharya | H04L 29/12009 709/203 |
| 2003/0115421 A1* | 6/2003 | McHenry | H04L 29/06 711/133 |
| 2004/0177147 A1* | 9/2004 | Joshi | H04L 29/06 709/227 |
| 2004/0205781 A1* | 10/2004 | Hill | G06F 9/546 719/328 |
| 2007/0038637 A1* | 2/2007 | Taneja | G06F 21/563 |
| 2007/0189312 A1* | 8/2007 | Acharya | H04L 29/12009 370/401 |
| 2007/0289006 A1* | 12/2007 | Ramachandran | H04L 63/08 726/10 |
| 2008/0140857 A1* | 6/2008 | Conner | G06Q 10/00 709/236 |
| 2008/0155250 A1* | 6/2008 | Tanizawa | H04L 9/32 713/152 |
| 2010/0146600 A1* | 6/2010 | Eldar | G06F 21/6218 726/5 |
| 2010/0162036 A1* | 6/2010 | Linden | G06F 11/181 714/4.11 |
| 2011/0041171 A1* | 2/2011 | Burch | H04L 63/08 726/7 |
| 2011/0161477 A1 | 6/2011 | Kowalski | |
| 2011/0231479 A1* | 9/2011 | Boydstun | H04L 67/2814 709/203 |
| 2012/0137213 A1 | 4/2012 | Hayler et al. | |
| 2012/0209942 A1* | 8/2012 | Zehavi | H04L 29/08729 709/213 |
| 2012/0210335 A1* | 8/2012 | Salt | G06F 9/541 719/315 |
| 2013/0227291 A1* | 8/2013 | Ahmed | H04L 63/0281 713/171 |
| 2014/0133489 A1* | 5/2014 | Bae | H04L 69/04 370/392 |
| 2014/0341109 A1* | 11/2014 | Cartmell | H04L 45/308 370/328 |
| 2015/0163251 A1* | 6/2015 | Kassaei | H04L 9/3234 726/1 |
| 2016/0088022 A1* | 3/2016 | Handa | G06F 16/957 726/1 |
| 2016/0088023 A1* | 3/2016 | Handa | G06F 16/957 726/1 |

FOREIGN PATENT DOCUMENTS

| | | |
|---|---|---|
| EP | 3198472 | 8/2017 |
| EP | 3198825 | 8/2017 |
| EP | 3198472 B1 | 6/2018 |
| EP | 3198825 B1 | 6/2018 |
| JP | 2005217828 A | 8/2005 |
| JP | 2006115059 A | 4/2006 |
| JP | 2012044283A A | 3/2012 |
| JP | 2012516112 A | 7/2012 |
| WO | 2013158514 A1 | 10/2013 |
| WO | 2016048418 | 3/2016 |
| WO | 2016048419 | 3/2016 |

OTHER PUBLICATIONS

Saini, Kulbir—Squid Proxy Server 3.1, (Year: 2011).*
U.S. Appl. No. 14/696,432, Non-Final Office Action dated Jul. 29, 2016, 13 pages.
International Application No. PCT/US2015/027757, International Preliminary Report on Patentability dated Sep. 5, 2016, 7 pages.
Anonymous: "Membrane Service Proxy documentation—Open Source Reverse Proxy for SOAP & REST—Membrane", Dec. 2, 2013, accessed on Dec. 9, 2015, retrieved from the internet: <URL:https://web.archive.org/web/20131202035553/http://www.membrane-soa.org/service-proxy/>.
Anonymous: "Membrane Service Proxy documentation—Open Source Reverse Proxy for SOAP & REST—Exposing SOAP Services as REST Resources", Dec. 28, 2013, accessed on Dec. 9, 2015, retrieved from the internet: <URL:https://web.archive.org/web/20131228213248/http://www.membrane-soa.org/service-proxy-doc/4.0/rest2soap-gateway.htm/>.
Hadley, Marc: "Web Application Description Language (WADL)", Feb. 2, 2009, accessed on Dec. 9, 2015, retrieved from the internet: <URL: http://wadl.java.net/wadl20090202.pdf>.
Rodriguez, Alex: "RESTful Web Services: The basics", IBM Developerworks, Nov. 6, 2008, retrieved from the internet: <URL:http://download.boulder.ibm.com/ibmdl/pub/software/dw/webservices/ws-restful/ws-restful-pdf.pdf>.
Saini, Kulbir, "Squid Proxy Server 3.1, Beginners Guide", Feb. 1, 2011 (Feb. 1, 2011), accessed on Dec. 9, 2015, retrieved from the internet: <URL: http://gocit.vn/files/Squid.Proxy.Server.3.1.Beginners.Guide-www.gocit.vn.pdf>.
International Search Report and Written Opinion for international patent application No. PCT/US15/27757, dated Jul. 30, 2015, all pages.
International Search Report and Written Opinion for international patent application No. PCT/US2015/027763, dated Jul. 30, 2015, all pages.
U.S. Appl. No. 14/696,432, Notice of Allowance dated Jan. 5, 2017, 21 pages.
JP Application No. 2017-514693 received an office action dated Oct. 16, 2016, all pages.
Membrane Service Proxy documentation—Open Source Reverse Proxy for Rest to Soap: Exposing Soap Services as Rest Resources, Dec. 28, 2013, all pages, retrieved from: https://web.archive.org/web/20131228213248/http://www.membrane-soa.org/service-proxy-doc/4.0/rest2soap-gateway.htm.
Membrane Service Proxy documentation—Open Source Reverse Proxy for Soap & Rest—Membrance, Dec. 2, 2013, 3 pages, retrieved from: https://web.archive.org/web/20131202035553/http://www.membrane-soa.org/service-proxy/.
JP 2017-514827 received an Office Action dated Dec. 4, 2018, 8 pages.

* cited by examiner

EXAMPLE POLICY MODEL FOR VIRTUAL APPLICATION

```
<?xml version = '1.0' encoding = 'UTF-8'?>
<wsp:Policy Name="virtualclipboard_app_ClipboardService_clipboard_POST_policy" orawsp:resource="/gateway-123456/
virtualclipboard_app_ClipboardService_clipboard_POST_policy" orawsp:category="security" orawsp:readOnly="true"
orawsp:status="enabled" wsu:Id="virtualclipboard_app_ClipboardService_clipboard_POST_policy">
<gwp:on-request orawsp:Silent="false" orawsp:Enforced="true" orawsp:name="On-Request" orawsp:category="gateway/
on-request">
    <wsp15:PolicyReference URI="oracle/multi_token_over_ssl_service_policy" />
    <wsp15:PolicyReference URI="oracle/oes_authorization_policy" />
</gwp:on-request>
<gwp:message-transformation orawsp:Enforced="true" orawsp:name="message-transform" orawsp:category="gateway/
transform">
    <gwp:output>application/soap+xml</gwp:output>
    <gwp:schema>Clipboard.xsd</gwp:schema>
    <gwp:qname>{http://clipboard}contents</gwp:qname>
</gwp:message-transformation>
<gwp:invoke orawsp:Enforced="true" orawsp:name="invoke-service" orawsp:category="gateway/invoke">
    <gwp:reference>#clipboard|VS-REST-REFERENCE(module/clipboard#POST)</gwp:reference>
    <wsp15:PolicyReference URI="oracle/wss11_saml_token_with_message_protection_client_policy" />
</gwp:invoke>
<gwp:message-transformation orawsp:Enforced="true" orawsp:name="message-transform" orawsp:category="gateway/
transform">
    <gwp:output>application/json</gwp:output>
    <gwp:schema>Clipboard.xsd</gwp:schema>
    <gwp:qname>{http://clipboard}contents</gwp:qname>
</gwp:message-transformation>
</wsp:Policy>
```

EXAMPLE POLICY MODEL FOR PROXY APPLICATION

```
<wsp:Policy Name="justthename_rest_policy" orawsp:attachTo="generic" orawsp:category="security"
orawsp:name="justthename_rest_policy" orawsp:resource="/gateway-123456/firstproxy" orawsp:status="enabled"
wsu:Id="justthename_rest_policy">
  <gwp:on-request orawsp:Enforced="true" orawsp:category="gateway/on-request" orawsp:name="On-Request">
    <wsp15:PolicyReference URI="oracle/wss_http_token_service_policy" orawsp:effective="true"
orawsp:provides=""/>
  </gwp:on-request>
  <gwp:invoke-proxy orawsp:Enforced="true" orawsp:category="gateway/invoke" orawsp:name="Invoke">
    <wsp15:PolicyReference URI="oracle/http_saml20_token_bearer_client_policy" orawsp:effective="true"
orawsp:provides=""/>
    <gwp:proxy-server>
      <gwp:host>www-proxy.us.oracle.com</gwp:host>
      <gwp:port>80</gwp:port>
    </gwp:proxy-server>
  </gwp:invoke-proxy>
</wsp:Policy>
```

FIG. 6B

EXAMPLE "ON REQUEST" MESSAGE PROCESSING POLICY TEMPLATE

```
<?xml version = '1.0' encoding = 'UTF-8'?>
<orawsp:Template
orawsp:Id="on_request_template"
orawsp:description="i18n:oracle.idm.gateway.common.resources.artifactsdescription.GatewayArtifactsDescriptio
nBundle_oracle/on_request_template_ATDescKey"
orawsp:displayName="i18n:oracle.idm.gateway.common.resources.artifactsdescription.GatewayArtifactsDescripti
onBundle_oracle/on_request_template_ATDispNameKey"
orawsp:readOnly="true"
orawsp:attachTo="generic"
xmlns:orawsp="http://schemas.oracle.com/ws/2006/01/policy"
orawsp:name="oracle/on_request_template"
orawsp:category="gateway"
xmlns:gwp="http://schemas.oracle.com/gw-policy">
    <gwp:on-request orawsp:name="On-Request" orawsp:Silent="true" orawsp:Enforced="true"
        orawsp:category="gateway/on-request"/>
    <wsp15:PolicyReference URI="" />
</orawsp:Template>
```

FIG. 7A

EXAMPLE "INVOKE" MESSAGE PROCESSING POLICY TEMPLATE

```xml
<?xml version = '1.0' encoding = 'UTF-8'?>
<orawsp:Template
    orawsp:Id="invoke_template"
    orawsp:description="i18n:oracle.idm.gateway.common.resources.artifactsdescription.GatewayArtifactsDescriptio
nBundle_oracle/invoke_template_ATDescKey"
    orawsp:displayName="i18n:oracle.idm.gateway.common.resources.artifactsdescription.GatewayArtifactsDescripti
onBundle_oracle/invoke_template_ATDispNameKey"
    orawsp:readOnly="true"
    orawsp:attachTo="generic"
    xmlns:orawsp="http://schemas.oracle.com/ws/2006/01/policy"
    orawsp:name="oracle/invoke_template"
    orawsp:category="gateway"
    xmlns:gwp="http://schemas.oracle.com/gw-policy">
    <gwp:invoke orawsp:name="Invoke" orawsp:Silent="true" orawsp:Enforced="true"
        orawsp:category="gateway/invoke"/>
    <wsp15:PolicyReference URI="" />
</orawsp:Template>
```

FIG. 7B

EXAMPLE "INVOKE PROXY" MESSAGE PROCESSING POLICY TEMPLATE

```
<?xml version = '1.0' encoding = 'UTF-8'?>
<orawsp:Template
    orawsp:Id="invoke_proxy_template"
    orawsp:description="i18n:oracle.idm.gateway.common.resources.artifactsdescription.GatewayArtifactsDescriptionBundle_oracle/invoke_proxy_template_ATDescKey"
    orawsp:displayName="i18n:oracle.idm.gateway.common.resources.artifactsdescription.GatewayArtifactsDescriptionBundle_oracle/invoke_proxy_template_ATDispNameKey"
        orawsp:readOnly="true"
        orawsp:attachTo="generic"
        xmlns:orawsp="http://schemas.oracle.com/ws/2006/01/policy"
        orawsp:name="oracle/invoke_proxy_template"
        orawsp:category="gateway"
        xmlns:gwp="http://schemas.oracle.com/gw-policy">
    <gwp:invoke-proxy orawsp:name="Invoke-Proxy" orawsp:Silent="true" orawsp:Enforced="true"
        orawsp:category="gateway/invoke"/>
        <wsp15:PolicyReference URI="" />
</orawsp:Template>
```

FIG. 7C

EXAMPLE "ON RESPONSE" MESSAGE PROCESSING POLICY TEMPLATE

```
<?xml version = '1.0' encoding = 'UTF-8'?>
<orawsp:Template
orawsp:Id="on_response_template"
orawsp:description="i18n:oracle.idm.gateway.common.resources.artifactsdescription.GatewayArtifactsDescriptio
nBundle_oracle/on_response_template_ATDescKey"
orawsp:displayName="i18n:oracle.idm.gateway.common.resources.artifactsdescription.GatewayArtifactsDescripti
onBundle_oracle/on_response_template_ATDispNameKey"
orawsp:readOnly="true"
orawsp:attachTo="generic"
xmlns:orawsp="http://schemas.oracle.com/ws/2006/01/policy"
orawsp:name="oracle/on_response_template"
orawsp:category="gateway"
xmlns:gwp="http://schemas.oracle.com/gw-policy">
    <gwp:on-response orawsp:name="On-Response" orawsp:Silent="true" orawsp:Enforced="true"
            orawsp:category="gateway/on-response"/>
    <wsp15:PolicyReference URI="" />
</orawsp:Template>
```

FIG. 7D

PROXY SERVERS WITHIN COMPUTER SUBNETWORKS

RELATED APPLICATIONS

The present application claims priority under 35 U.S.C. § 119(e) to U.S. Provisional Patent Application No. 62/054,613, filed Sep. 24, 2014, entitled "MOBILE SECURITY ACCESS SERVER (MSAS)," the entire contents of which are incorporated herein by reference for all purposes.

BACKGROUND

The present disclosure relates generally to systems, methods and machine-readable media for providing security services. More particularly, this disclosure relates to systems, methods and machine-readable media for providing security services for connections between mobile devices and enterprise applications, including authentication, authorization, auditing, single sign on, security policy enforcement, key management and distribution, secure communication, secure data storage, and secure data sharing, among others.

BRIEF SUMMARY

Aspects described herein provide various techniques for processing messages transmitted between computer networks. In some embodiments, messages such as requests and responses for various types of web services, applications, and other web content may be transmitted between multiple computer networks. One or more intermediary devices or applications, such as a proxy server implemented within a physical or logical subnetwork, may receive, process, and transmit the messages between the communication endpoints. For example, a proxy server may be configured to operate within a subnetwork of an internal computer network, exposing various web applications and/or services of the internal computer network to external computer networks.

In certain embodiments, a proxy server may receive a message transmitted from an endpoint in an internal network to an endpoint in an external system, or vice versa. The message may be analyzed in order to determine an intended destination of the message, and/or whether the proxy server should act as a forward proxy or a reverse proxy when processing the message. Additionally, the proxy server may determine a current point in a predetermined processing flow, such as an end-to-end policy model for processing specific messages. Based on the analyses of the message and the current point in the predetermined processing flow, the proxy server may select one or more policies to be applied to the message. Such policies may include security policies as well as other communication management policies, for example, to authenticate messages, provide security token mediation and key management, perform protocol and payload mediation, perform device-based security, support demilitarized zone (DMZ) threat protection, and the like. After selecting the specific policies to be applied to the message, the proxy server may process the message in accordance with the policies and forward the message to its intended destination.

Further, as the examples discussed herein illustrate, various embodiments may support dynamic policy models in which different security policies and other communication management policies may be applied, within a DMZ or other logical or physical subnetwork, at various different processing points throughout the end-to-end processing flow of a message. Such dynamic policy model frameworks may be used to build and implement various types of computer network and system security and other communication policies that might be not possible or preferable within the communication endpoints.

BRIEF DESCRIPTION OF THE DRAWINGS

FIGS. 6A and 6B are markup language documents illustrating examples of predetermined message processing flows, according to one or more embodiments of the present invention.

FIGS. 7A-7D are markup language documents illustrating example templates of message processing policies that correspond to different points within one or more message processing flows, according to one or more embodiments of the present invention.

DETAILED DESCRIPTION

Figure 1:
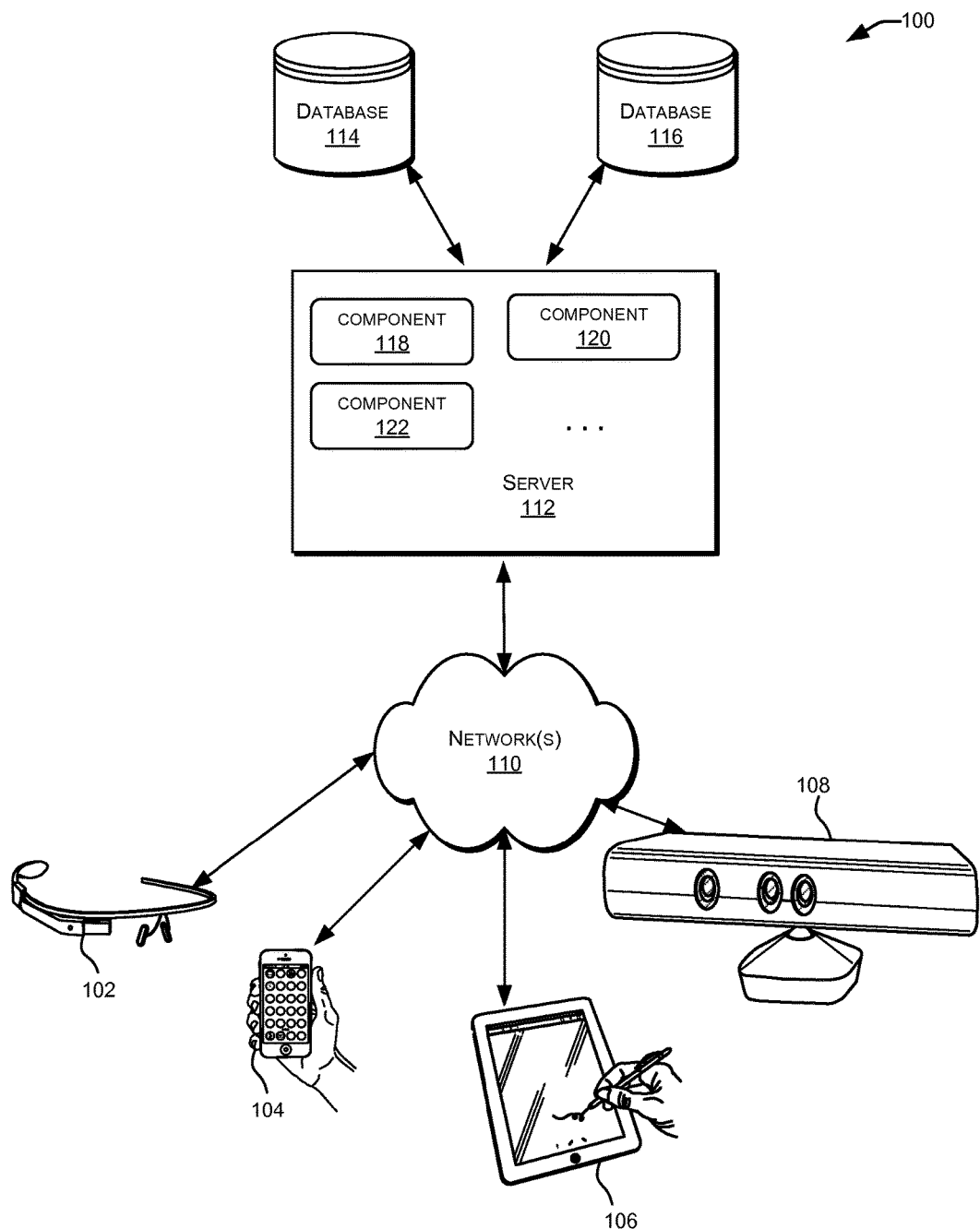
FIG. 1 is a block diagram illustrating components of an exemplary distributed system in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to non-transitory media such as portable or fixed storage devices, optical storage devices, and various other mediums capable of storing, containing or carrying instruction(s) and/or data. A code segment or computer-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various techniques (e.g., methods, systems, non-transitory computer-readable storage memory storing a plurality of instructions executable by one or more processors, etc.) are described herein for processing messages transmitted between computer networks. In some embodiments, messages such as requests and responses for various types of web services, applications, and other web content may be transmitted between multiple computer networks. One or more intermediary devices or applications, such as a proxy server implemented within a physical or logical subnetwork, may receive, process, and transmit the messages between the communication endpoints. For example, a proxy server may be configured to operate within a subnetwork of an internal computer network, exposing various web applications and/or services of the internal computer network to external computer networks.

In some embodiments, a proxy server may receive a message transmitted from an endpoint in an internal network to an endpoint in an external system, or vice versa. The message may be analyzed in order to determine an intended destination of the message, and/or whether the proxy server should act as a forward proxy or a reverse proxy when processing the message. Additionally, the proxy server may determine a current point in a predetermined processing flow, such as an end-to-end policy model for processing specific messages. Based on the analyses of the message and the current point in the predetermined processing flow, the proxy server may select one or more policies to be applied to the message. Such policies may include security policies as well as other communication management policies, for example, to authenticate messages, provide security token mediation and key management, perform protocol and payload mediation, perform device-based security, support demilitarized zone (DMZ) threat protection, and the like. After selecting the specific policies to be applied to the message, the proxy server may process the message in accordance with the policies and forward the message to its intended destination. Various additional details of embodiments of the present invention will be described below with reference to the figures.

FIG. 1 is a block diagram illustrating components of an exemplary distributed system in which various embodiments of the present invention may be implemented. In the illustrated embodiment, distributed system 100 includes one or more client computing devices 102, 104, 106, and 108, which are configured to execute and operate a client application such as a web browser, proprietary client (e.g., Oracle Forms), or the like over one or more network(s) 110. Server 112 may be communicatively coupled with remote client computing devices 102, 104, 106, and 108 via network 110.

In various embodiments, server 112 may be adapted to run one or more services or software applications provided by one or more of the components of the system. In some embodiments, these services may be offered as web-based or cloud services or under a Software as a Service (SaaS) model to the users of client computing devices 102, 104, 106, and/or 108. Users operating client computing devices 102, 104, 106, and/or 108 may in turn utilize one or more client applications to interact with server 112 to utilize the services provided by these components.

In the configuration depicted in the figure, the software components 118, 120 and 122 of system 100 are shown as being implemented on server 112. In other embodiments, one or more of the components of system 100 and/or the services provided by these components may also be implemented by one or more of the client computing devices 102, 104, 106, and/or 108. Users operating the client computing devices may then utilize one or more client applications to use the services provided by these components. These components may be implemented in hardware, firmware, software, or combinations thereof. It should be appreciated that various different system configurations are possible, which may be different from distributed system 100. The embodiment shown in the figure is thus one example of a distributed system for implementing an embodiment system and is not intended to be limiting.

Client computing devices 102, 104, 106, and/or 108 may be portable handheld devices (e.g., an IPHONE®, cellular telephone, an IPAD®, computing tablet, a personal digital assistant (PDA)) or wearable devices (e.g., a GOOGLE GLASS® head mounted display), running software such as MICROSOFT WINDOWS MOBILE®, and/or a variety of mobile operating systems such as IOS®, WINDOWS PHONE®, ANDROID®, BLACKBERRY 10®, PALM OS®, and the like, and being Internet, e-mail, short message service (SMS), BLACKBERRY®, or other communication protocol enabled. The client computing devices can be general purpose personal computers including, by way of example, personal computers and/or laptop computers running various versions of MICROSOFT WINDOWS®, APPLE MACINTOSH®, and/or LINUX® operating systems. The client computing devices can be workstation computers running any of a variety of commercially-available UNIX® or UNIX-like operating systems, including without limitation the variety of GNU/Linux operating systems, such as for example, GOOGLE CHROME OS. Alternatively, or in addition, client computing devices 102, 104, 106, and 108 may be any other electronic device, such as a thin-client computer, an Internet-enabled gaming system (e.g., a MICROSOFT XBOX gaming console with or without a KINECT® gesture input device), and/or a personal messaging device, capable of communicating over network(s) 110.

Although exemplary distributed system 100 is shown with four client computing devices, any number of client computing devices may be supported. Other devices, such as devices with sensors, etc., may interact with server 112.

Network(s) 110 in distributed system 100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), APPLETALK®, and the like. Merely by way of example, network(s) 110 can be a local area network (LAN), such as one based on Ethernet, Token-Ring and/or the like. Network(s) 110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, BLUETOOTH®, and/or any other wireless protocol); and/or any combination of these and/or other networks.

Server 112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 112 may be adapted to run one or more services or software applications described in the foregoing disclosure. For example, server 112 may correspond to a server for performing processing described above according to an embodiment of the present disclosure.

Server 112 may run an operating system including any of those discussed above, as well as any commercially available server operating system. Server 112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 112 may include one or more applications to analyze and consolidate data feeds and/or event updates received from users of client computing devices 102, 104, 106, and 108. As an example, data feeds and/or event updates may include, but are not limited to, TWITTER® feeds, FACEBOOK® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 112 may also include one or more applications to display the data feeds and/or real-time events via one or more display devices of client computing devices 102, 104, 106, and 108.

Distributed system 100 may also include one or more databases 114 and 116. Databases 114 and 116 may reside in a variety of locations. By way of example, one or more of databases 114 and 116 may reside on a non-transitory storage medium local to (and/or resident in) server 112. Alternatively, databases 114 and 116 may be remote from server 112 and in communication with server 112 via a network-based or dedicated connection. In one set of embodiments, databases 114 and 116 may reside in a storage-area network (SAN). Similarly, any necessary files for performing the functions attributed to server 112 may be stored locally on server 112 and/or remotely, as appropriate. In one set of embodiments, databases 114 and 116 may include relational databases, such as databases provided by Oracle, that are adapted to store, update, and retrieve data in response to SQL-formatted commands.

Figure 2:
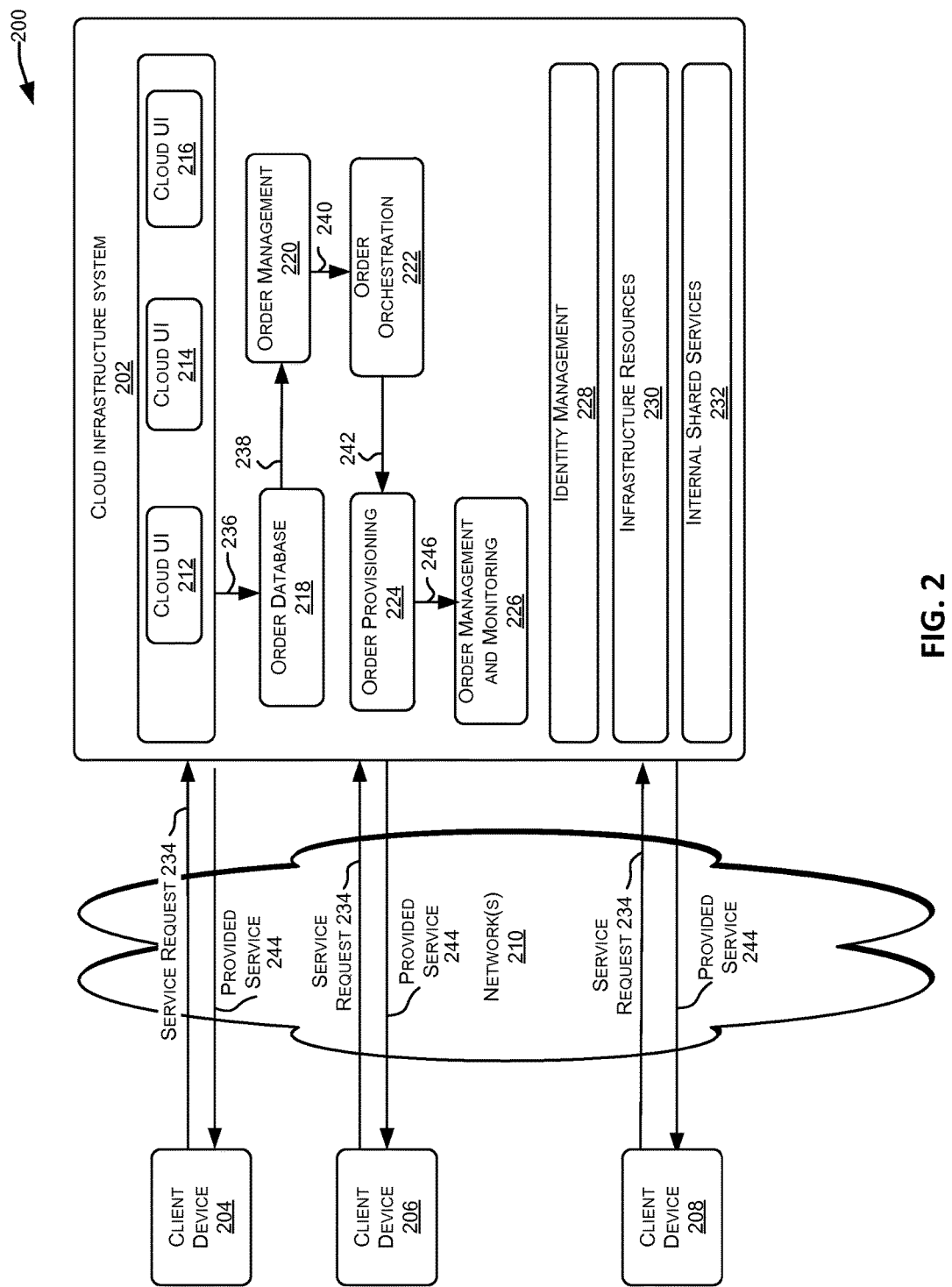
FIG. 2 is a block diagram illustrating components of a system environment by which services provided by embodiments of the present invention may be offered as cloud services.

FIG. 2 is a block diagram illustrating components of a system environment by which services provided by embodiments of the present invention may be offered as cloud services. In the illustrated embodiment, system environment 200 includes one or more client computing devices 204, 206, and 208 that may be used by users to interact with a cloud infrastructure system 202 that provides cloud services. The client computing devices may be configured to operate a client application such as a web browser, a proprietary client application (e.g., Oracle Forms), or some other application, which may be used by a user of the client computing device to interact with cloud infrastructure system 202 to use services provided by cloud infrastructure system 202.

It should be appreciated that cloud infrastructure system 202 depicted in the figure may have other components than those depicted. Further, the embodiment shown in the figure is only one example of a cloud infrastructure system that may incorporate an embodiment of the invention. In some other embodiments, cloud infrastructure system 202 may have more or fewer components than shown in the figure, may combine two or more components, or may have a different configuration or arrangement of components.

Client computing devices 204, 206, and 208 may be devices similar to those described above for 102, 104, 106, and 108.

Although exemplary system environment 200 is shown with three client computing devices, any number of client computing devices may be supported. Other devices such as devices with sensors, etc. may interact with cloud infrastructure system 202.

Network(s) 210 may facilitate communications and exchange of data between clients 204, 206, and 208 and cloud infrastructure system 202. Each network may be any type of network familiar to those skilled in the art that can support data communications using any of a variety of commercially-available protocols, including those described above for network(s) 110.

Cloud infrastructure system 202 may comprise one or more computers and/or servers that may include those described above for server 112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 202 may be adapted to automatically provision, manage and track a customer's subscription to services offered by cloud infrastructure system 202. Cloud infrastructure system 202 may provide the cloud services via different deployment models. For example, services may be provided under a public cloud model in which cloud infrastructure system 202 is owned by an organization selling cloud services (e.g., owned by Oracle) and the services are made available to the general public or different industry enterprises. As another example, services may be provided under a private cloud model in which cloud infrastructure system 202 is operated solely for a single organization and may provide services for one or more entities within the organization. The cloud services may also be provided under a community cloud model in which cloud infrastructure system 202 and the services provided by cloud infrastructure system 202 are shared by several organizations in a related community. The cloud services may also be provided under a hybrid cloud model, which is a combination of two or more different models.

In some embodiments, the services provided by cloud infrastructure system 202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 202. Cloud infrastructure system 202 then performs processing to provide the services in the customer's subscription order.

In some embodiments, the services provided by cloud infrastructure system 202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 202 may also include infrastructure resources 230 for providing the resources used to provide various services to customers of the cloud infrastructure system. In one embodiment, infrastructure resources 230 may include pre-integrated and optimized combinations of hardware, such as servers, storage, and networking resources to execute the services provided by the PaaS platform and the SaaS platform.

In some embodiments, resources in cloud infrastructure system 202 may be shared by multiple users and dynamically re-allocated per demand. Additionally, resources may be allocated to users in different time zones. For example, cloud infrastructure system 230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 232 may be provided that are shared by different components or modules of cloud infrastructure system 202 and by the services provided by cloud infrastructure system 202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 202, and the like.

In one embodiment, as depicted in the figure, cloud management functionality may be provided by one or more modules, such as an order management module 220, an order orchestration module 222, an order provisioning module 224, an order management and monitoring module 226, and an identity management module 228. These modules may include or be provided using one or more computers and/or servers, which may be general purpose computers, specialized server computers, server farms, server clusters, or any other appropriate arrangement and/or combination.

In exemplary operation 234, a customer using a client device, such as client device 204, 206 or 208, may interact with cloud infrastructure system 202 by requesting one or more services provided by cloud infrastructure system 202 and placing an order for a subscription for one or more services offered by cloud infrastructure system 202. In certain embodiments, the customer may access a cloud User Interface (UI), cloud UI 212, cloud UI 214 and/or cloud UI 216 and place a subscription order via these UIs. The order information received by cloud infrastructure system 202 in response to the customer placing an order may include information identifying the customer and one or more services offered by the cloud infrastructure system 202 that the customer intends to subscribe to.

After an order has been placed by the customer, the order information is received via the cloud UIs, 212, 214 and/or 216.

At operation 236, the order is stored in order database 218. Order database 218 can be one of several databases operated by cloud infrastructure system 218 and operated in conjunction with other system elements.

At operation 238, the order information is forwarded to an order management module 220. In some instances, order management module 220 may be configured to perform billing and accounting functions related to the order, such as verifying the order, and upon verification, booking the order.

At operation 240, information regarding the order is communicated to an order orchestration module 222. Order orchestration module 222 may utilize the order information to orchestrate the provisioning of services and resources for the order placed by the customer. In some instances, order orchestration module 222 may orchestrate the provisioning of resources to support the subscribed services using the services of order provisioning module 224.

In certain embodiments, order orchestration module 222 enables the management of business processes associated with each order and applies business logic to determine whether an order should proceed to provisioning. At operation 242, upon receiving an order for a new subscription, order orchestration module 222 sends a request to order provisioning module 224 to allocate resources and configure those resources needed to fulfill the subscription order. Order provisioning module 224 enables the allocation of resources for the services ordered by the customer. Order provisioning module 224 provides a level of abstraction between the cloud services provided by cloud infrastructure system 200 and the physical implementation layer that is used to provision the resources for providing the requested services. Order orchestration module 222 may thus be isolated from implementation details, such as whether or not services and resources are actually provisioned on the fly or pre-provisioned and only allocated/assigned upon request.

At operation 244, once the services and resources are provisioned, a notification of the provided service may be sent to customers on client devices 204, 206 and/or 208 by order provisioning module 224 of cloud infrastructure system 202.

At operation 246, the customer's subscription order may be managed and tracked by an order management and monitoring module 226. In some instances, order management and monitoring module 226 may be configured to collect usage statistics for the services in the subscription order, such as the amount of storage used, the amount data transferred, the number of users, and the amount of system up time and system down time.

In certain embodiments, cloud infrastructure system 200 may include an identity management module 228. Identity management module 228 may be configured to provide identity services, such as access management and authorization services in cloud infrastructure system 200. In some embodiments, identity management module 228 may control information about customers who wish to utilize the services provided by cloud infrastructure system 202. Such information can include information that authenticates the identities of such customers and information that describes which actions those customers are authorized to perform relative to various system resources (e.g., files, directories, applications, communication ports, memory segments, etc.) Identity management module 228 may also include the management of descriptive information about each customer and about how and by whom that descriptive information can be accessed and modified.

Figure 3:
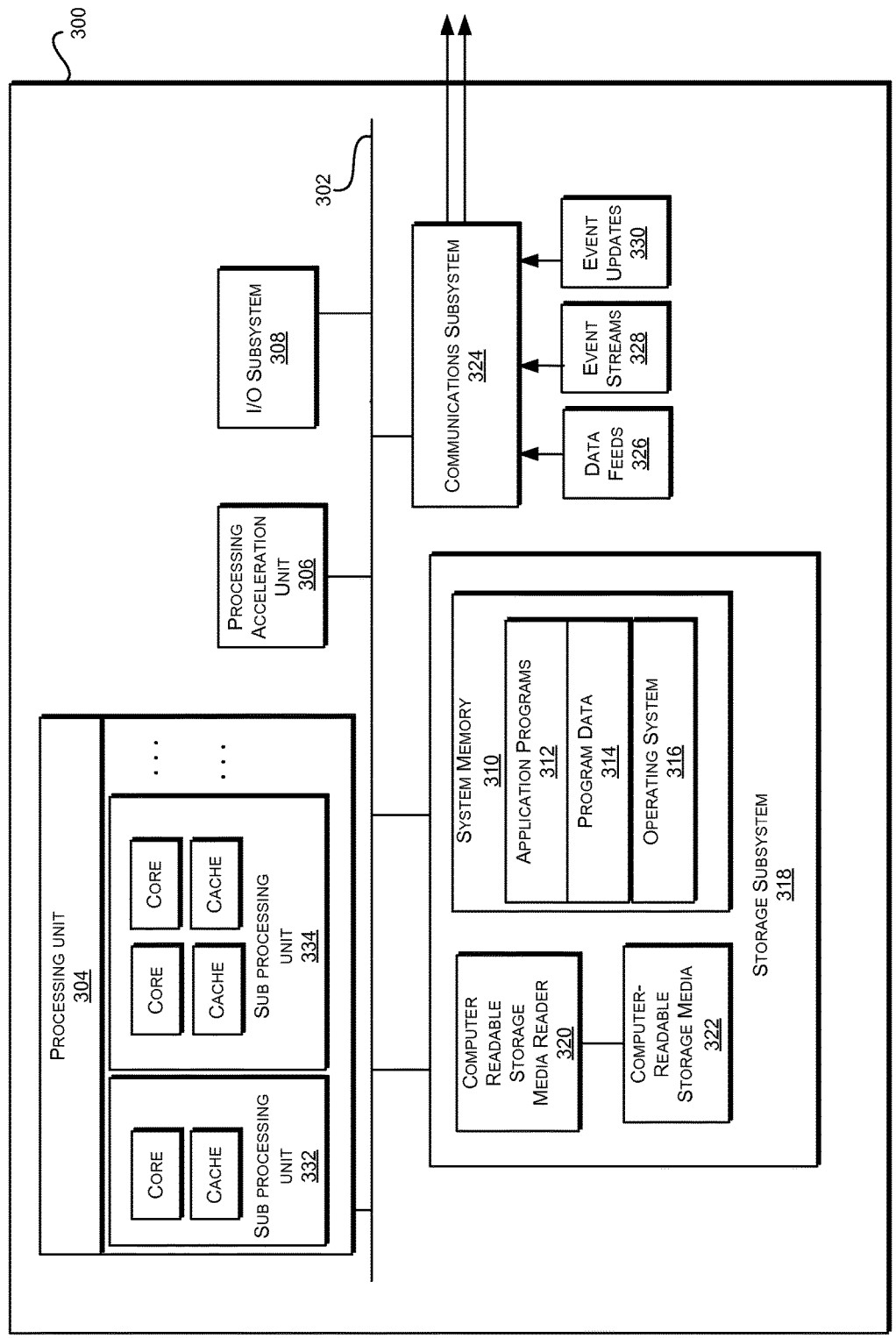
FIG. 3 is a block diagram illustrating an exemplary computer system in which embodiments of the present invention may be implemented.

FIG. 3 is a block diagram illustrating an exemplary computer system in which embodiments of the present invention may be implemented. The system 300 may be used to implement any of the computer systems described above. As shown in the figure, computer system 300 includes a processing unit 304 that communicates with a number of peripheral subsystems via a bus subsystem 302. These peripheral subsystems may include a processing acceleration unit 306, an I/O subsystem 308, a storage subsystem 318 and a communications subsystem 324. Storage subsystem 318 includes tangible computer-readable storage media 322 and a system memory 310.

Bus subsystem 302 provides a mechanism for letting the various components and subsystems of computer system 300 communicate with each other as intended. Although bus subsystem 302 is shown schematically as a single bus, alternative embodiments of the bus subsystem may utilize multiple buses. Bus subsystem 302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 304, which can be implemented as one or more integrated circuits (e.g., a conventional microprocessor or microcontroller), controls the operation of computer system 300. One or more processors may be included in processing unit 304. These processors may include single core or multicore processors. In certain embodiments, processing unit 304 may be implemented as one or more independent processing units 332 and/or 334 with single or multicore processors included in each processing unit. In other embodiments, processing unit 304 may also be implemented as a quad-core processing unit formed by integrating two dual-core processors into a single chip.

In various embodiments, processing unit 304 can execute a variety of programs in response to program code and can maintain multiple concurrently executing programs or processes. At any given time, some or all of the program code to be executed can be resident in processor(s) 304 and/or in storage subsystem 318. Through suitable programming, processor(s) 304 can provide various functionalities described above. Computer system 300 may additionally include a processing acceleration unit 306, which can include a digital signal processor (DSP), a special-purpose processor, and/or the like.

I/O subsystem 308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the MICROSOFT KINECT® motion sensor that enables users to control and interact with an input device, such as the MICROSOFT XBOX® 360 game controller, through a natural user interface using gestures and spoken commands. User interface input devices may also include eye gesture recognition devices such as the GOOGLE GLASS® blink detector that detects eye activity (e.g., 'blinking' while taking pictures and/or making a menu selection) from users and transforms the eye gestures as input into an input device (e.g., GOOGLE GLASS®). Additionally, user interface input devices may include voice recognition sensing devices that enable users to interact with voice recognition systems (e.g., SIRI® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 300 may comprise a storage subsystem 318 that comprises software elements, shown as being currently located within a system memory 310. System memory 310 may store program instructions that are loadable and executable on processing unit 304, as well as data generated during the execution of these programs.

Depending on the configuration and type of computer system 300, system memory 310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 304. In some implementations, system memory 310 may include multiple different types of memory, such as static random access memory (SRAM) or dynamic random access memory (DRAM). In some implementations, a basic input/output system (BIOS), containing the basic routines that help to transfer information between elements within computer system 300, such as during start-up, may typically be stored in the ROM. By way of example, and not limitation, system memory 310 also illustrates application programs 312, which may include client applications, Web browsers, mid-tier applications, relational database management systems (RDBMS), etc., program data 314, and an operating system 316. By way of example, operating system 316 may include various versions of MICROSOFT WINDOWS®, APPLE MACINTOSH®, and/or LINUX® operating systems, a variety of commercially-available UNIX® or UNIX-like operating systems (including without limitation the variety of GNU/Linux operating systems, the GOOGLE CHROME® OS, and the like) and/or mobile operating systems such as IOS, WINDOWS® PHONE, ANDROID® OS, BLACKBERRY® 10 OS, and PALM® OS operating systems.

Storage subsystem 318 may also provide a tangible computer-readable storage medium for storing the basic programming and data constructs that provide the functionality of some embodiments. Software (programs, code modules, instructions) that when executed by a processor provide the functionality described above may be stored in storage subsystem 318. These software modules or instructions may be executed by processing unit 304. Storage subsystem 318 may also provide a repository for storing data used in accordance with the present invention.

Storage subsystem 300 may also include a computer-readable storage media reader 320 that can further be connected to computer-readable storage media 322. Together and, optionally, in combination with system memory 310, computer-readable storage media 322 may comprehensively represent remote, local, fixed, and/or removable storage devices plus storage media for temporarily and/or more permanently containing, storing, transmitting, and retrieving computer-readable information.

Computer-readable storage media 322 containing code, or portions of code, can also include any appropriate media known or used in the art, including storage media and communication media, such as but not limited to, volatile and non-volatile, removable and non-removable media implemented in any method or technology for storage and/or transmission of information. This can include non-transitory and tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 300.

By way of example, computer-readable storage media 322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and BLU-RAY® disk, or other optical media. Computer-readable storage media 322 may include, but is not limited to, ZIP® drives, flash memory cards, universal serial bus (USB) flash drives, secure digital (SD) cards, DVD disks, digital video tape, and the like. Computer-readable storage media 322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 300.

Communications subsystem 324 provides an interface to other computer systems and networks. Communications subsystem 324 serves as an interface for receiving data from and transmitting data to other systems from computer system 300. For example, communications subsystem 324 may enable computer system 300 to connect to one or more devices via the Internet. In some embodiments communications subsystem 324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 324 can provide wired network connectivity (e.g., Ethernet) in addition to or instead of a wireless interface.

In some embodiments, communications subsystem 324 may also receive input communication in the form of structured and/or unstructured data feeds 326, event streams 328, event updates 330, and the like on behalf of one or more users who may use computer system 300.

By way of example, communications subsystem 324 may be configured to receive data feeds 326 in real-time from users of social networks and/or other communication services such as TWITTER® feeds, FACEBOOK® updates, web feeds such as Rich Site Summary (RSS) feeds, and/or real-time updates from one or more third party information sources.

Additionally, communications subsystem 324 may also be configured to receive data in the form of continuous data streams, which may include event streams 328 of real-time events and/or event updates 330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 324 may also be configured to output the structured and/or unstructured data feeds 326, event streams 328, event updates 330, and the like to one or more databases that may be in communication with one or more streaming data source computers coupled to computer system 300.

Computer system 300 can be one of various types, including a handheld portable device (e.g., an IPHONE® cellular phone, an IPAD® computing tablet, a PDA), a wearable device (e.g., a GOOGLE GLASS® head mounted display), a PC, a workstation, a mainframe, a kiosk, a server rack, or any other data processing system.

Due to the ever-changing nature of computers and networks, the description of computer system 300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

As introduced above, embodiments of the invention provide techniques for processing messages transmitted between computer networks. More specifically, certain embodiments provide techniques for transmitting messages, such as requests and responses for various types of web services, applications, and other web content, between multiple computer networks. One or more intermediary devices or applications, such as a proxy server implemented within a physical or logical subnetwork, may receive, process, and transmit the messages between the communication endpoints. In some embodiments, proxy servers may receive messages transmitted from an endpoint in an internal network to an endpoint in an external system, or vice versa. The messages may be analyzed in order to determine an intended destination of the messages, and/or whether the proxy server should act as a forward proxy or a reverse proxy when processing the messages. The proxy server also may determine a current point in a predetermined processing flow for the messages, such as an end-to-end policy model used to process specific messages. Based on the analyses of the messages and the current point in the predetermined processing flow, the proxy server may select one or more policies to be applied to the messages. Such policies may include security policies as well as other communication management policies, for example, to authenticate messages, provide security token mediation and key management, perform protocol and payload mediation, perform device-based security, support demilitarized zone (DMZ) threat protection, and the like. After selecting the specific policies to be applied to the messages, the proxy server may process the messages in accordance with the policies and forward the messages to their intended destinations.

Figure 4:
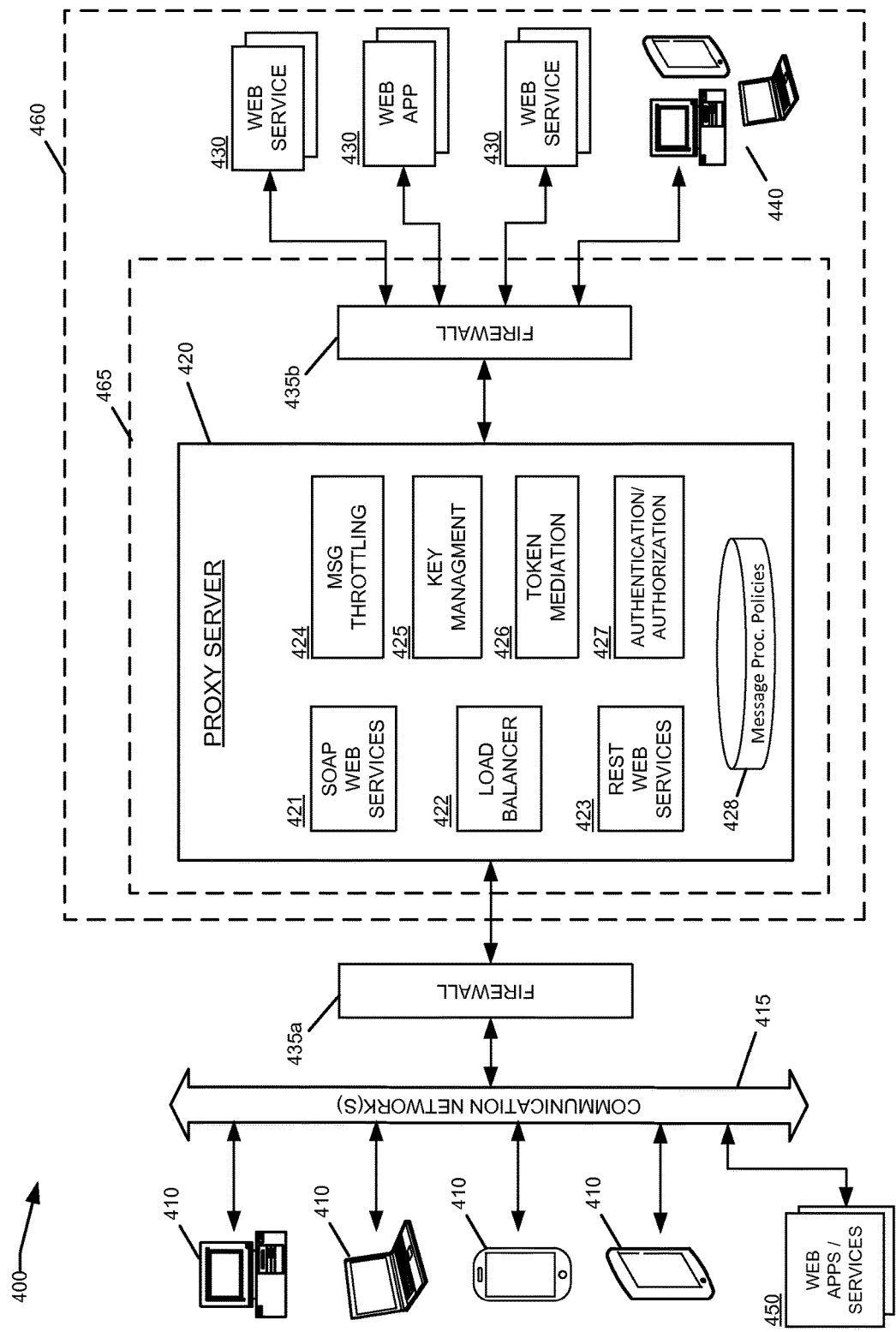
FIG. 4 is a block diagram illustrating, at a high-level, a computing environment including a proxy server for processing and transmitting messages between computing devices and/or systems, according to one or more embodiments of the present invention.

FIG. 4 is a block diagram illustrating components of a computing environment 400 including a proxy server 420 for processing and transmitting messages between computing devices and/or systems in various computer networks. Computing environment 400 illustrated in this example may correspond to a high-level computer architecture designed to provide various client devices with access to computing resources such as web applications and web services. In various embodiments, computing environment 400 may range from a small and simple computing system to a large and highly complex system including hardware, software, and network components designed to integrate with other such systems to support the computing needs of various organizations. The computing environment 400 may be implemented as a multi-tier computer architecture, which may include web-based and/or cloud-based implementations, and in which various endpoint devices (e.g., user devices 410, web application or web service providers 430, etc.) interact via one or more middle-tier systems. Additionally, each component shown in computing environment 400 may be implemented as an individual computer system including various combinations of hardware, software, and/or network components. In other cases, multiple components shown in computing environment 400 may be implemented as logical subcomponents (e.g., software applications embodied on computer-readable media, etc.) operating with combined computer systems.

As shown in FIG. 4, the computing environment 400 may correspond to a client-server system in which client devices 410 may transmit various computer request(s) 415, firewall(s) 435, proxy server 420, and/or other intermediary devices, to one or more backend web applications or web services 430. Web applications or services 430 may include any application programming interfaces (APIs), services, applications, and any other information assets exposed by the various systems 430, including but not limited to Simple Object Access protocol (SOAP) web services or APIs, Representational State Transfer (REST) web services or APIs, and/or web content exposed via Hypertext Transfer Protocol (HTTP) or HTTP Secure protocols. In such cases, the proxy server 420 may act as a reverse proxy server providing a security layer between the client devices 410 and backend services/applications 430. When acting as a reverse proxy, proxy server 420 may provide a central access point for the backend services/applications 430, along with service virtualization and enforcement of various security and management policies associated with the backend services/applications 430. When acting as a reverse proxy, the proxy server 420 may expose the backend services/applications 430 while virtualizing and obscuring these backend services/applications 430. For instance, the proxy server 420 may expose only virtual uniform resource locators (URLs) so that client devices 410 on untrusted networks might not see or have knowledge of the underlying backend web services/applications 430.

Additionally or alternatively, computing environment 400 may correspond to a client-server system for requests-responses transmitted in the opposite direction. For example, as client devices 440 operating within the same internal computer network 460 as the web services/applications 430 may transmit requests to web services or applications 450 operating on various external computer systems and networks beyond the proxy server 420 and firewall(s) 435. In such cases, the proxy server 420 may act as a forward proxy server providing a security layer between the client devices 440 within the internal network 460 and the backend services/applications 450 on the external network. As with reverse proxy operation, the communications in forward proxy operation may include requests to and responses from SOAP web services, REST web services, HTTP/HTTPS web content, and the like. When the proxy server 420 is operating as a forward proxy server, the client devices 440 within the internal network may know about the backend services/applications 450 and those services/applications 450 may receive direct transmissions from the proxy server 420 configured on the client side. In such cases, the proxy server 420 may provide security for the forward proxy uniform resource identifier (URI) endpoints, using any security or communication management policies.

In either forward proxy mode or reverse proxy mode, the proxy server 420 may support various security and authentication features, such as Kerberos Kinit-based authentication, Kerberos Pkinit-based authentication, open standard for authorization protocol version 2.0 (OAuth2) based authentication, TLP-based authentication, create session tokens and/or challenge-based authentication of backend services using Simple and Protected GSSAPI Negotiation Mechanism (SPNEGO) tokens, WINDOWS NT LAN Manager (NTLM) tokens, Security Assertion Markup Language (SAML) tokens, and the like.

Client devices 410 and 440 may include desktop or laptop computers, mobile devices, and other various computing devices/systems, including some or all of the hardware, software, and networking components discussed above in the illustrative computing systems in FIGS. 1-3. In some embodiments, client devices 410 and 440 may include one or more client software applications (e.g., web browsers) configured to request and receive data from the backend web services/applications 430 and 450. Client devices 410 and 440 also may include the necessary hardware and software components to establish the network interfaces, security and authentication capabilities, and content caching capabilities to receive the live content and provide it to users in real-time (or near real-time).

Communication networks 415 may include any combination of computer networks and other communication networks described herein. For example, networks 415 may include TCP/IP (transmission control protocol/Internet protocol) networks such as local area networks (LANs), wide area networks (WANs) (e.g., the Internet), and various wireless telecommunications networks. Additionally, it should been understood that communication network 415 may represent combinations of many different physical and logical networks separating client devices 410 from backend applications/services 430. In addition to one or more firewalls 435, various servers such as web servers, authentication servers, and/or specialized networking components, such as firewalls, routers, gateways, load balancers, and the like, may facilitate communication between client devices 410 and backend applications/services 430.

As discussed below, proxy server 420 may be implemented as isolated computer system (e.g., a proxy computer server) or as combination of computer multiple computing systems including specialized hardware, software, and network components. Alternatively or additionally, proxy server 420 may be a proxy server software application executing within a network device (e.g., a web server or firewall) or a computer server within a trusted network 460. Thus, proxy server 420 may reside in physical subnetwork or a logical subnetwork 465 of the internal computer network 460, and in either case, may act as an intermediary between clients/servers on a trusted internal network and clients/servers on untrusted external networks. Additionally, each of the components 421-428 within proxy server 420 may be implemented as separate computing systems configured to communicate with proxy server 420, or may operate as logical subcomponents integrated within the same computer server as the proxy server 420. In either case, each component 421-428 may be implemented using specialized hardware, software, network, and memory subsystems to perform the techniques described herein.

In this example, proxy server 420 includes a load balancer 422 configured to receive messages from external client devices 410 via communication networks 415 and/or firewalls 435. In some embodiments, load balancer 422 may be entry point for all TCP, UDP, HTTP, and HTTPS traffic from any external networks to the backend services/applications 430. Load balancer 422 also may be configured to communicate with backend servers, and to transmit responses to client devices 410. After receiving and parsing messages, load balancer 422 may transmit the messages (e.g., via Java Native Interface (JNI) or .NET programming framework, etc.) to an appropriate web services framework. For example, SOAP requests received at the proxy server 420 from client devices may be transmitted to a SOAP web services framework 421, and REST requests may be transmitted to a REST web services framework 423. Web content requests may be handled similarly by parsing and transmitting the requests to various components, such as URL virtualization component or service. These web services and components may also be configured to perform protocol transformations, such as SOAP to REST and REST to SOAP message transformations, as well as JavaScript Object Notation (JSON) to XML or JSON to SOAP, and vice versa.

Message throttling system (or message throttling subcomponent) 424 may be configured to monitor network traffic received from client devices 410 and/or backend services/applications 430. The message throttling system 424 may have configurable message rate limits for specific client devices 410 and/or specific web services or applications 430. The message throttling system 424 may use existing policies to allow a certain number of messages to/from a specified client 410, or to/from a specified web service/application 430. When the number of messages exceeds the message rate limit, then the message throttling system 424 may be configured to perform an action such as sending alerts, logging, or suspending future message transmissions.

Proxy server 420 also may include various security systems or components configured to implement various security policies within the proxy server 420. In this example, proxy server 420 includes a key management system 425, a token mediation system 426, and authentication and authorization systems 427. These systems and security components within the proxy server 420 may authenticate messages from client devices 410, provide security token mediation, perform API key management, perform fine grained authorization and/or data redaction, support confidentiality and integrity, perform risk-based authentication, perform device-based security for mobile client devices 410, support demilitarized zone (DMZ) threat protection, perform protocol and payload mediation, and the like. For example, load balancer 422 and/or the authentication/authorization systems 427 may include subsystems to prevent of Denial of Service (DoS) attacks, detect and filter malformed messages, detect and prevent SQL, JavaScript, and/or XPath/XQuery injection attacks, perform message validation to protect against malicious content (e.g., detect viruses within message attachments, validate XML and JSON data structures, validate form and query parameters, etc.). Token mediation system 426 may be configured to convert authentication tokens between specified client devices 410 and backend web services/applications 430. Security systems 424-427 may also support orchestration and by removing of operations, for example, by aggregating multiple backend APIs or services and perform automatic mediation or composition.

Additionally, in this example, the proxy server 420 includes a data store of message processing policies 428. Message processing policies may be stored in various forms of computer-readable media, such as XML, JavaScript, or other types of executable software components. As discussed below in more detail, message processing policies 428 may be used to enforce security policies and other communications management policies within the proxy server 420. Data store 428 may include individual message processing policies that may be retrieved and applied to individual messages at various stages during an end-to-end processing flow for the individual messages. The message processing policy data store 428 may reside in the proxy server 420, as shown in this example, or may reside within a backend server of a trusted internal computer network, or a secure third-party server, or the like.

As shown in FIG. 4, proxy server 420 may be implemented within an intermediary network device between two or more computer networks, for example, between a first trusted internal network providing web applications/services 430, and a second untrusted external network 415 (e.g., the Internet) over which various untrusted client devices 410 may access the internal web applications/services 430. In some embodiments, proxy server 420 may operate within a subnetwork of an internal computer network, in order to provide an initial layer of security and communications management for the internal computer network. For example, a secure internal network 460 may include a plurality of web services/applications 430, along with various other servers and client devices 440. Proxy server 420 and/or additional devices may be part of the same internal network 460, but may operate within a physical subnetwork 465 of the internal computer network, separated from the internal computer network by firewall 435b. In some examples, proxy server 420 may be implemented as a proxy server application executing within a logical subnetwork 465 (but not a physical subnetwork) of the internal computer network 460. Thus, proxy server 420 may reside on the same computing systems as the firewall 435b and/or one or more of the backend web services/applications 430.

Additionally, in some embodiments, the proxy server 420 may operate within a demilitarized zone (DMZ) network between a trusted internal network 460 and an untrusted external network. The DMZ may be implemented as a physical subnetwork 465 that provides a first layer of security and communications management, separate from the endpoint security provided at client devices 410 and 440 and backend web services/applications 430 and 450. As shown in FIG. 4, a DMZ may be implemented between two firewalls 435a and 435b. In other embodiments, the DMZ may be implemented using a single firewall, or using other various configurations of network devices that physically or logically separate a subnetwork 465 both from the trusted internal network 460 and the untrusted external network. All computer servers and other devices within the DMZ, such as proxy server 420, may have limited connectivity to a specific subset of the devices within the internal network 460 (e.g., web applications/servers 430). Such connectivity may be limited based on the specific hosts, ports, protocols, and the like. Similarly, policies of limited connectivity may be enforced on the devices within the DMZ when communication with any external untrusted network (e.g., network 415 and devices 410). In addition to operating a proxy server 420 within a DMZ, in certain embodiments, one or more of the backend web servers/applications 430 may operate within a DMZ. For instance, certain servers that are more vulnerable or prone to attacks from external systems (e.g., web servers, email servers, Domain Name System (DNS) servers, etc.) may be moved into the DMZ with the proxy server 420.

Figure 5:
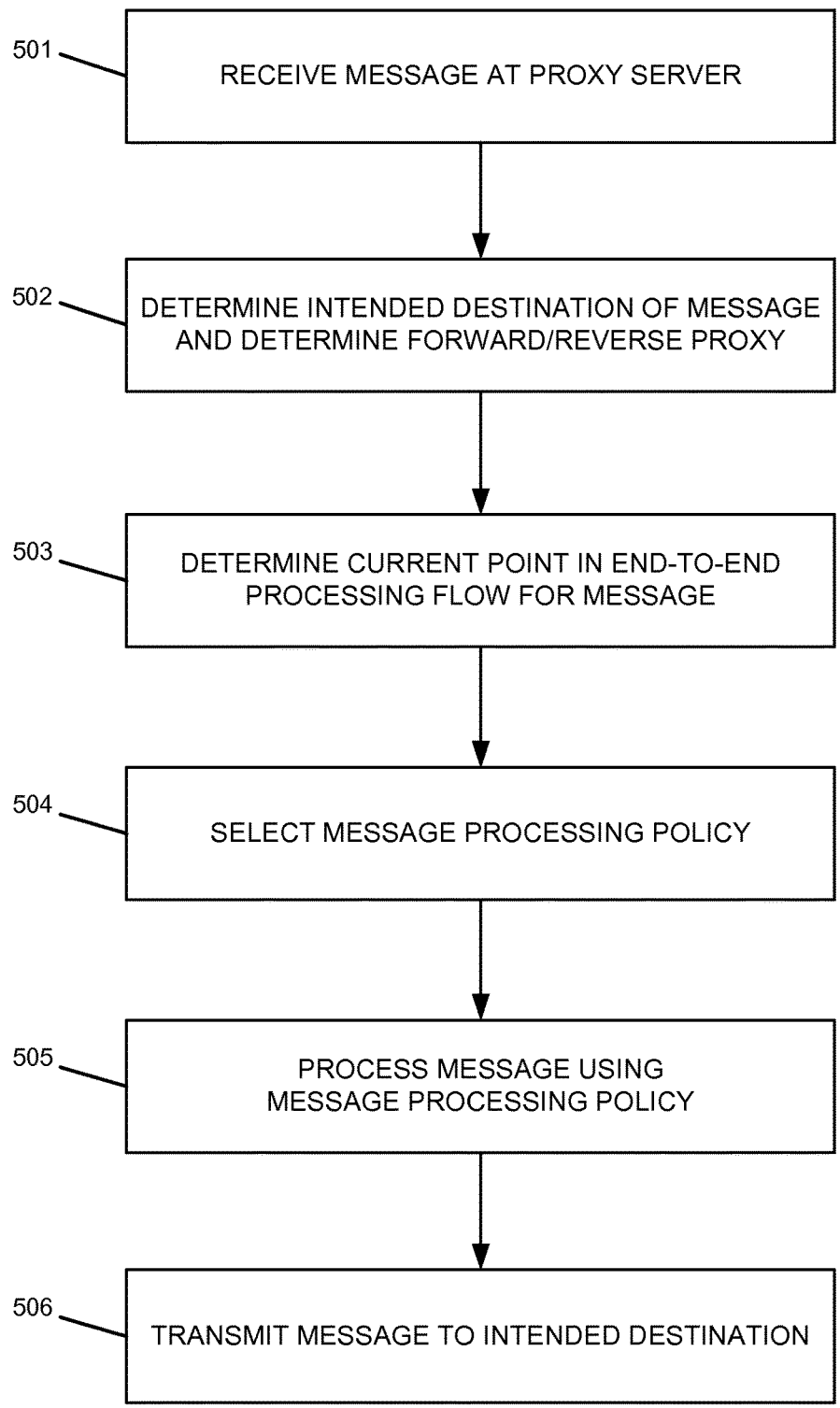
FIG. 5 is a flowchart illustrating a process for receiving and processing messages using selected message processing policies, according to one or more embodiments of the present invention.

Referring now to FIG. 5, a flowchart is shown illustrating a process for receiving and processing messages using selected message processing policies. As described below, the steps in this process may be performed by one or more components in the computing environment 400, such as the proxy server 420 and the various subsystems/subcomponents implemented therein. Additionally, in some embodiments, certain steps in this process may be performed within client devices 410, backend web services/applications 430, and/or by other various intermediary devices. It should further be understood that the techniques described herein, including receiving and analyzing messages, selecting message processing policies and processing messages, need not be limited to the specific system and hardware implementations described above, but may be performed within other hardware and system environments comprising other combinations of the hardware, software, and network components.

In step 501, a network message may be received by an intermediary computing system or application, such as proxy server 420. As noted above, proxy server 420 may be implemented as an intermediary server device and/or application between a trusted internal network 460 and one or more untrusted external networks. Therefore, the network message received in step 501 might not be intended for the proxy server 420. Instead, the proxy server 420 may intercept a message transmitted by a first endpoint device (e.g., a client device 410) and intended for a second endpoint device (e.g., a computer server hosting backend web services and/or applications 430), or vice versa.

In some embodiments, all network traffic entering or leaving an internal network 460 may be routed through the proxy server 420. In other cases, the proxy server 420 may be configured to intercept specific types or protocols of network messages, for example, HTTP requests from client devices 410 and 440 for SOAP, REST, or URL resources, and HTTP responses from SOAP, REST, or URL web services/applications 430 and 450 back to the client devices. Therefore, the network message received in step 501 may be, for example and without limitation, a TCP message, an HTTP or HTTPS message, a Simple Mail Transport Protocol (SMTP), a User Datagram Protocol (UDP) message, and/or a Java Message Service (JMS) message. In some cases, the network message may correspond to a SOAP, REST, or web content request from a client device 410 to a backend computer server hosting web services/applications 430, or to response by a backend web service or application 430 to a SOAP, REST, or web content request from a client device 410. Additionally, the network message may correspond to a SOAP, REST, or web content request from a client device 440 operating within the internal computer network 460 to a computer server 450 providing web services/applications operating on an external computer network, or a response from an external web service or application 450 to a SOAP, REST, or web content request from an internal client device 440.

In step 502, the proxy server 420 may analyze the network message received in step 501 to determine the intended destination of the message, and also to determine whether the proxy server 420 should act as a forward proxy (i.e., forward proxy mode) or a reverse proxy (i.e., reverse proxy mode) when processing the network message. The intended destination of the message may be determined by parsing and analyzing portions of the message header and/or message body. For example, the uniform resource identifier (URI) of the message, or an identifier of a web service or application and/or operation identifiers within the message body may correspond to a web service/application or web content provided by the internal network 460. In this example, the proxy server 420 may determine based on the message header and content that the message is intended for a specific server within the internal network 460. In another example, if the message URI corresponds to a remote server on an untrusted network, then the proxy server 420 may determine that the intended destination of the message is the remote server, rather than a device within the internal network 460. Information within the message identifying the transmitter of the message, such as a source IP address or host name identifier, also may be used to determine the intended destination of the message.

In addition to determining the intended destination of the message, the proxy server 420 may determine whether the message is part of a request from a client device 410 or 440, or a response from a web service/application server device 430 or 450, in order to determine whether the proxy server 420 should operate in forward proxy mode or reverse proxy mode when processing the message. For example, if the received message is a request from a client device 410 to a web service or application 430, then the intended destination is within the trusted internal network 460 and the proxy server 420 should operate in reverse proxy mode. In contrast, if the received message is a request from an internal client device 440 to an external web service 450, web application 450, or URL 450, then the intended destination is outside of the trusted internal network and the proxy server 420 should operate in forward proxy mode.

In other cases, the message received in step 501 might not be a request from a client device 410 or 440, but instead may be a response from a web server 430 or 450 to a previous request. For example, if the received message is a response from a web service/application 430 or other server within the trusted internal network 460 to a request from a client device 410, then the intended destination of the original request is within the trusted internal network 460 and the proxy server 420 should operate in reverse proxy mode. In contrast, if the received message is a response from a web service/application 450 or other server outside of the internal network 460 to a request from a client device 440, then the intended destination of the original request is outside of the internal network 460 and the proxy server 420 should operate in forward proxy mode.

In step 503, the proxy server 420 may determine a current point in a predetermined processing flow for the message received in step 501. A message processing flow may refer to an end-to-end message processing flow to be executed by the proxy server 420, beginning with the receipt of the message by the proxy server 420 from the client device 410 or 440, and concluding with the transmission of the response by the proxy server 420 to the client device 410 or 440. As discussed below, determining a current point in a predetermined processing flow for a message may include identifying a policy model associated with the message, and determining a current processing location within the processing model.

In some embodiments, predetermined message processing flows for messages may be defined by policy models. A policy model may include data defining a set of policies (e.g., security policies, communication management policies, etc.) that may be applied by the proxy server 420 to process the message at various points during the end-to-end message processing flow of the message. Both the policy models that define the end-to-end processing flow of a message, and the individual message processing policies, may be various forms of computer-readable media, such as XML, JavaScript, or other types of executable software components. Policy models and/or message processing policies may be stored within the proxy server 420, for example, in data store 428, or elsewhere within the internal network 460.

As noted above, policy models may define a set of message processing policies that the proxy server 420 may apply to a message at various points in the message's end-to-end processing flow. In some embodiments, the proxy server 420 may apply different policy models in step 503, depending on the characteristics of the message received in step 501. For example, the specific policy model retrieved and applied by the proxy server 420 may depend on the intended destination of the message and the determination of forward or reverse proxy mode, performed in step 502. Additionally, the policy model retrieved and applied by the proxy server 420 may depend on the network protocols used to transmit the message and/or the request type or client type of the message. For instance, different policy models may be used for REST requests, SOAP requests, web content (URL) requests, and the like.

Referring briefly to FIGS. 6A and 6B, two examples of policy models are shown, both of which are implemented in XML. FIG. 6A shows an example policy model for a virtual application. Thus, example policy model 600a may be retrieved and used for message processing for reverse proxy use-cases. In contrast, FIG. 6B shows an example policy model for a proxy application, and therefore example policy model 600b may be retrieved and used for message processing for forward proxy use-cases. As shown in these each of examples, policy models may include tags or identifiers of various points within processing flows (which also may be called "assertions"), and one or more policy identifiers for each of processing points/assertions. For instance, example policy model 600a identifies two policies to be performed when a request is received (within the "on-request" tag), policies that perform message transformation (within the "message-transformation" tags), and a policy to be performed when a backend web service is invoked (within the "invoke" tag). Example policy model 600b identifies a policy to be performed when a request is received (within the "on-request" tag), and a policy to be performed when a backend web service is invoked (within the "invoke-proxy" tag).

In some embodiments, the proxy server 420 may apply policies at the service level (or URL level) for proxy applications (i.e., in forward proxy mode), whereas for virtual applications (i.e., in reverse proxy mode) the proxy server 420 may apply policies at the service level and/or at the operation level (or method level). Therefore, when invoking backend web services/applications 430 within the trusted internal network 460, the proxy server 420 may first determine the operation (for SOAP) or the method (for REST and URL) before it can enforce the policies identified within the policy model.

After identifying a policy model (or other data defining a processing flow) associated with the message received in step 501, the proxy server 420 may determine the current point in the processing the message in accordance with the policy or processing flow. The current point in the message processing flow may be determined by the characteristics of the message itself, as well as based on the previously stored data regarding the earlier processing of the message. As noted above, a predetermined processing flow may apply end-to-end processing for a message, from the initial request by a client device 410 or 440, to the response transmitted back to the client device 410 or 440. Therefore, determining whether the message received in step 501 is an initial request from a client device, a transmission of additional data from a client device (e.g., authentication credentials or additional data related to a request), a response from a backend web service/application, or a transmission of additional data from a backend server or device (e.g., data from a single sign-on or token translation service), may allow the proxy server 420 to determine the current point of message processing within the end-to-end message processing flow. Additionally, the proxy server 420 may store data relating to previous processing performed on the message or other related messages, such as the results of previous message transformations, invocations of services, processing errors encountered, in order to determine the next message processing policy that the proxy server 420 should apply to the message.

The following paragraphs include several examples of possible points (which also may be called "assertions") within a policy model or other message processing flow, at which message processing policies may be applied. It should be understood that these examples are illustrative only and need not be an exhaustive list. Moreover, the assertion names described herein (e.g., OnRequest, OnInvoke, OnResponse, OnError, MessageTransformation, etc.), as well as the XML structures and tag names used for assertions and policies may be changed in various other embodiments.

A first example of determining a current point within a policy model or other predetermined message processing flow in step 503, may include determining that the message received in step 501 corresponds to a request from a client device 410 in an external computer network. This point, at the beginning of the end-to-end processing flow of the message, may be referred to as an "OnRequest" assertion or the like. As discussed below in more detail, an OnRequest assertion may include references to policies that may be applied in order to secure virtual services, proxy services, and/or web applications. For example, an OnRequest assertion may include URIs or other identifiers representing the security policies that the proxy server 420 should enforce for new web service/application/content requests received from external client devices 410. OnRequest assertions also may refer to other policies and/or may contain other assertions. In some cases, OnRequest assertions may only operate in reverse proxy mode, that is, may only handle requests from external client devices 410 for internal web resources 430. In such cases, requests from internal client devices 440 for external web resources 450 may be handled by different assertions which may apply different message processing policies.

Another determination of the current message processing point that may occur in step 503 may include, after receiving the request from the external client device 410, determining that the proxy server 420 should transmit the request to a backend web application or web service 430 in the internal computer network 460. This point within the end-to-end processing flow of the message may be referred to as an "OnInvoke" assertion or the like. Like the OnRequest assertion, in some embodiments, the OnInvoke assertion may apply only in reverse proxy use cases in which the initial request was received from an external client device 410 to invoke backend web services/applications 430 within the internal network 460. OnInvoke assertions may include URIs or other identifiers representing the policies that the proxy server 420 should enforce during this point in the end-to-end processing flow. Multiple policy identifiers (or references) may be including within an OnInvoke assertion, for example, by using multiple XML "Policy URI" XML elements. Additionally, OnInvoke assertions may uniquely identify the client details from using the client's resource pattern. The client type used for OnInvoke assertions (e.g., a REST client, SOAP client, URL/web client, etc.) may be determined by the proxy server 420 at runtime, based on the values configured within the OnInvoke assertion. OnInvoke assertions also may refer to other policies and/or may contain other assertions.

Another example of determining the current message processing point may include, after receiving the request from the external client device 410 and after invoking the backend web service/application 430, determining that the proxy server 420 should transmit the response to the external client device 410. This point within the end-to-end processing flow of the message may be referred to as an "OnResponse" assertion or the like. Like the OnRequest and OnInvoke assertions, in some embodiments, the OnResponse assertion may apply only in reverse proxy use cases in which the initial request was received from an external client device 410 to invoke backend web services/applications 430 within the internal network 460. OnResponse assertions may include URIs or other identifiers representing the policies that the proxy server 420 should enforce during this point in the end-to-end processing flow. Multiple policy identifiers (or references) may be including within an OnResponse, and OnResponse assertions also may refer to other policies and/or may contain other assertions.

Another determination of the current message processing point that may occur in step 503 may include determining that the proxy server 420 should transmit a request from an internal client device 440 to an external web service or application 450. This point within the end-to-end processing flow of the message may be referred to as an "OnProxyInvoke" assertion or the like. Unlike the OnInvoke example assertion discussed above, the OnProxyInvoke assertion might apply only in forward proxy use cases in which the initial request was received from an internal client device 440 to invoke backend web services/applications 450 within an untrusted external network. OnProxyInvoke assertions may include URIs or other identifiers representing the policies that the proxy server 420 should enforce during this point in the end-to-end processing flow. Multiple policy identifiers (or references) may be including within an OnProxyInvoke assertion, for example, by using multiple XML "Policy URI" XML elements. The client type used for OnProxyInvoke assertions (e.g., a REST client, SOAP client, URL/web client, etc.) may be determined by the proxy server 420 at runtime, for example, based on runtime arguments. OnProxyInvoke assertions also may refer to other policies and/or may contain other assertions.

Another example of determining the current message processing point may include, at some point during the end-to-end processing flow, determining that the proxy server 420 should transform the message from one message type to another. This point within the end-to-end processing flow of the message may be referred to as a "MessageTransformation" assertion or the like. For instance, the proxy server 420 may receive a message having of a first message type (e.g., a REST request), and may analyze the message to determine that the message is intended for a backend service or application that only accepts a second message type (e.g., a back SOAP service). After such a determination, the proxy server 420 may execute the appropriate MessageTransformation assertion on the message, before sending the transformed message to the intended destination. Examples of transformation policies that may be supported by the proxy server 420 may include, without limitation, XML to JavaScript Object Notation (JSON) and JSON to XML policies, XML to SOAP and SOAP to XML policies, and JSON to SOAP and SOAP to JSON policies. Transformation between other well-known media types may be supported in various embodiments. The proxy server 420 may automatically attach the appropriate transformation policies at the time of the backend service virtualization, and the transformations may be performed using one or more translation frameworks installed at the proxy server 420 or elsewhere in the computing environment 400. In some embodiments, MessageTransformation assertions may only operate in reverse proxy mode, that is, may only be supported for transformations of requests from external client devices 410 for internal web resources 430 and for responses back to the client devices 410. In other embodiments, MessageTransformation assertions may be supported for both forward proxy and reverse proxy use-cases.

Another example of determining the current message processing point may include determining that an error has occurred at some point during the end-to-end processing flow for the message. This point within the end-to-end processing flow of the message may be referred to as an "OnError" assertion or the like. The errors triggering an OnError assertion for a message (e.g., triggering the execution of one or more policies identified in an OnError assertion associated with a message), may be errors occurring within the processing done by the proxy server 420 and/or error received by the proxy server 420 from a backend computer server or device. For example, the proxy server 420 may receive an error indication from a backend computer server invoked during the processing flow of the message, such as an authorization service, a token translation service, or a backend web service/application 430 or 450. Additionally, the proxy server 420 may identify or generate errors while performing message processing tasks the message that triggers the policies in the OnError assertion may be errors occurring within the message processing done by the proxy server 420, such as errors in parsing or validating a message, or errors when executing a message transformation policy. Thus, unlike some of the previous examples of the points within processing flows (also called "assertions") at which specific message processing policies may be applied, OnError assertions may be conditional. That is, during the end-to-end processing flow of a message, the proxy server 420 may apply a policy from OnError assertion once, multiple times, or not at all depending on the number and type of errors that may occur during the processing. In various different embodiments, OnError assertions may be applied in forward proxy use-cases, reverse proxy use-cases, or both.

In step 504, one or more specific policies for processing the message received in step 501 may be selected and retrieved by the proxy server 420. As discussed above, the specific policies selected and applied to messages by the proxy server 420 may include security policies as well as any other types of communication management policies. For example, and without limitation, such policies may perform functions relating to authentication, authorization, auditing, single sign on, security policy enforcement, key management and distribution, secure communication, secure data storage, and secure data sharing, among others.

Policies may be selected in step 504 by proxy server 420 by first retrieving the end-to-end processing flow(s) (e.g., policy models) that are associated with the message, and then using the current point (e.g., assertion) within the end-to-end processing flows, determined in step 503, to identify the specific policies that will be applied to the message at the current point in the end-to-end flow. For instance, if the message received in step 501 is a request from an external client device 410 for a web service/application 430, and if the example policy model 600*a* is used to control the end-to-end processing of such messages, then the proxy server 420 may retrieve any policies identified within the "on-request" tag of the policy model 600*a*. In this instance, two policies identifiers are found within the "on-request" tag of policy model 600*a*, each of which is contained within a "PolicyReference URI" tag. Thus, in this example, the proxy server 420 may select these two policies in step 504 to be used for processing the message in step 505.

As another example, if the message received in step 501 is a request from an internal client device 440 to access an external web service/application 450, and if the example policy model 600*b* is used to control the end-to-end processing of such messages, then the proxy server 420 may retrieve the policy identified within the "on-request" tag of the policy model 600*b*. Alternatively, if the "on-request" policy has already been applied and the proxy server 420 is ready to transmit the request to the external web service/application 450, then the proxy server 420 may retrieve the policy identified within the "invoke-proxy" tag of the policy model 600*b*.

In step 505, the proxy server 420 may process the message using the policies selected in step 504. As discussed above, the proxy server 420 may determine the appropriate policies to be applied to the message by identifying URI's or other policy identifiers from a predetermined end-to-end processing flow for the message. In the example policy models 600*a* and 600*b*, the URI's of the policies to be applied may be found within the "PolicyReference URI" tags of the assertions corresponding to the current point in the end-to-end processing flow. Such policy URI's may reference the storage locations of the policies. In other examples, policies identifiers need not be represented as URI's, but may be include other identifying data such as API or service identifiers, function names, method names, and/or operation names, and the like. In any case, policy identifiers may identify the storage location or other access information for the message processing policies. The policies themselves may be stored in various forms of computer-readable media, such as XML, JavaScript, or other types of executable software components.

Message processing policies may be stored in data stores, such as databases and/or file-based storage systems, located in various different servers or devices within the computing environment 400. For example, certain policies may be stored locally within the proxy server 420 (e.g., within the message processing policy data store 428), such as message transformation policies, message throttling policies, load balancing policies, and other policies which may be relatively unchanging and are without secure data. Other policies may be stored within a secure server or storage system of trusted internal computer network 460, such as user authentication/authorization policies and other policies that may be change frequently or may include secure data. In other cases, certain policies may be stored on secure third-party servers or client devices 410 in external networks. The proxy server 420 may be configured to retrieve and apply policies from any of these various locations in step 505.

In step 506, after processing the message using various security policies and/or other communication management policies in step 505, the proxy server 420 may transmit the processed message to its intended destination. As discussed above, the intended destination may be determined in step 502 by parsing and analyzing portions of the message header and/or message body. The intended destination of the message may be within the internal network 460, such as a request to a web service/application 430, or a response or other transmission to an internal client device 440. Alternatively, the intended destination of the message may be in an external network, such as a request to an external web service/application 450, or a response or other transmission to an external client device 410.

As discussed above, the selection and application of specific policies for processing a message within the proxy server 420 may be determined by a predetermined end-to-end processing flow for the message, along with a determination of the current processing point for the message within the end-to-end flow. Policy models, introduced above, may define the set of message processing policies that the proxy server 420 will apply to a message at various points in the message's end-to-end processing flow. For instance, example policy models 600*a* and 600*b* define the end-to-end processing flow for a virtual application (i.e., a reverse proxy use-case) and a proxy application (i.e., a forward proxy use-case) respectively. These policy models identify various points (or assertions) within the end-to-end processing flow of the message, and include specific policies to be applied to the message at each identified processing point or assertion.

In some embodiments, policy models and other techniques for defining end-to-end processing flows may be created using a set of policy templates. For example, referring briefly to FIGS. 7A-7D, four example policy templates are shown corresponding to four different assertions. FIG. 7A shows an example "On Request" policy template; FIG. 7B shows an example "Invoke" policy template; FIG. 7C shows an example "Invoke Proxy" policy template; and FIG. 7D shows an example "On Response" policy template. Each of the policy templates in FIGS. 7A-7D includes a "PolicyReference URI" tag, but the URI has been left empty in these templates. Thus, such templates may be used to create policy models end-to-end processing flows, such as policy models 600*a* and 600*b*. For example, one or more of the templates in FIGS. 7A-7D may be copied and the appropriate policy URI's may be inserted into each template copy. The customized templates then may be added to appropriate policy models to define the policies that may be executed during the end-to-end processing flow.

In addition to defining the assertions and policies to be executed during an end-to-end processing flow, policy models (and other forms of predetermined end-to-end processing flows) also may define the conditions under which certain policies may or may not be performed. In some embodiments, a policy model may contain a set of logical instructions to that implement conditions for performing each of the policies referenced in the policy model. For example, a policy model may include conditions that instruct the proxy server 420 that a certain policy should be executed for some message types (e.g., SOAP, REST, or URL messages), but not for other message types. Additionally, as discussed above, policy models may selectively apply policies at the service/application level and/or at the operation/method level in some cases, and thus the application of specific policies may depend not only on the backend web application/service 430 being invoked, but also on the specific operations or methods being called within the application/service 430. In various additional embodiments, some policy models may include conditions that instruct the proxy server 420 that a certain policy should be executed for some users but not others, some client device types but not others, some backend web services/applications but not others, and/or any other characteristics relating to the message.

Figure 8:
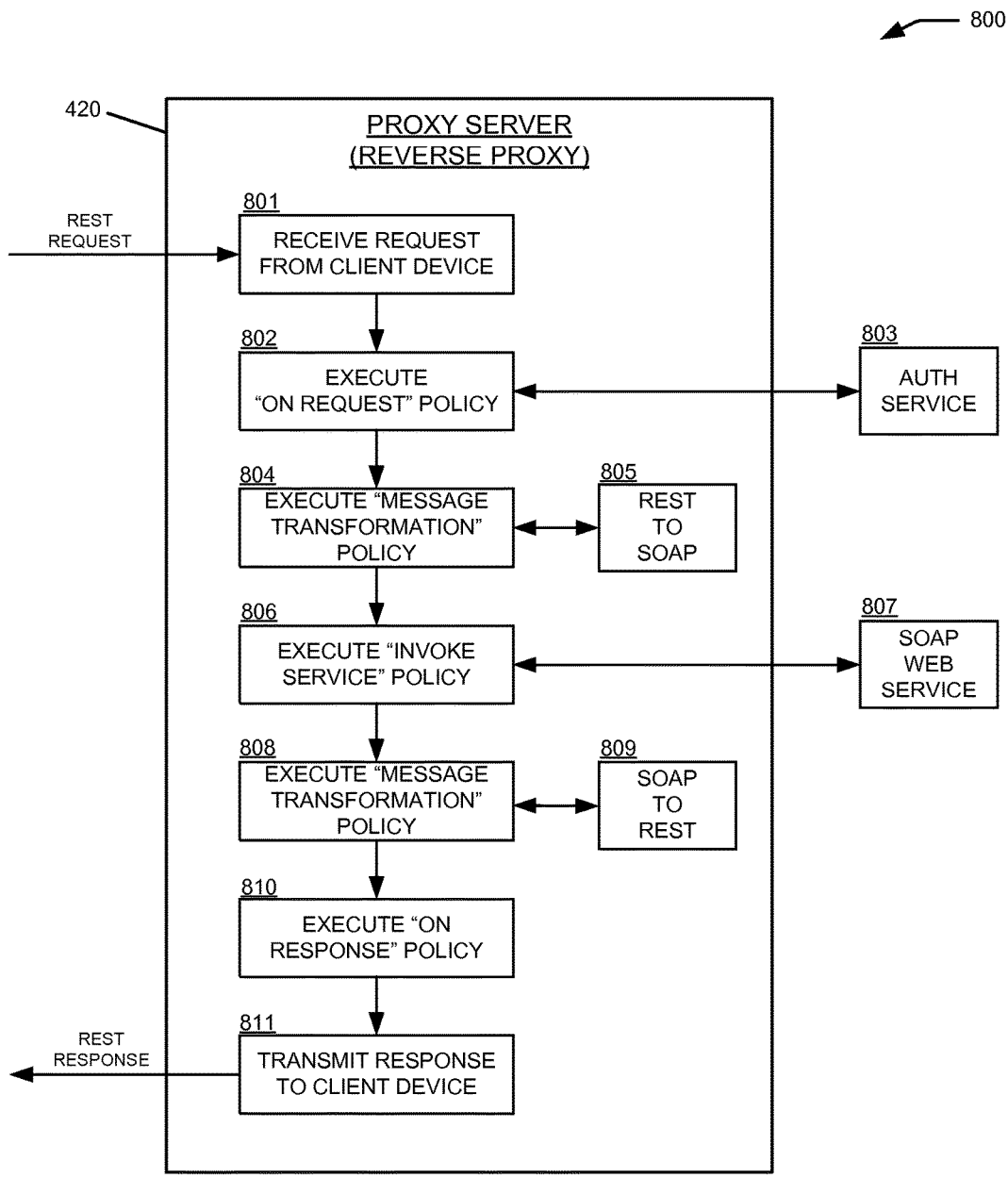
FIG. 8 is a flow diagram illustrating an end-to-end processing flow of a web service request sent from an external client device to an internal web service, according to one or more embodiments of the present invention.

Referring now to FIG. 8, an example diagram is shown of an end-to-end processing flow of a REST request sent from an external client device 410 to an internal SOAP web service 430. The execution of the processing flow in this example may be performed by the proxy server 420, along with various other components in the computing environment 400 as described above. In this example, the initial message is a REST request from a client device 410 intended for a backend web service 430 in the internal computer network 460, and thus the proxy server 420 may operate in reverse proxy mode.

As discussed above, the end-to-end processing flow diagram 800 in this example may be controlled by a predetermined policy model that defines the specific processing points (or assertions) and the specific policies that should be executed by the proxy server 420 at each processing point during an end-to-end processing flow. In this example, a REST request is received from a client device 410 at step 801. In step 802, the proxy server 420 may execute one or more "On Request" policies identified within the policy model that controls the processing of this request. In this example, an "On Request" policy includes accessing an authentication/authorization service in step 803 to authenticate the user credentials received from the client device 410 and/or confirm the authorization permissions of the user to access the requested backend web service 430. In step 804, the proxy server 420 determines the requested service requires SOAP input, and therefore executes a "Message Transformation" policy in step 805 to convert the REST request to a SOAP request. In step 806, the proxy server 420 executes an "Invoke Service" policy that may implement various security and communication management functions, before transmitting the SOAP request to the backend SOAP web service 430 in step 807. In step 808, after receiving the SOAP response from the backend SOAP web service 430, the proxy server 420 again may determine that the output to the client 410 should be a REST output, and therefore may execute another "Message Transformation" policy in step 809 to convert the SOAP response to a REST response. In step 810, the proxy server 420 executes an "On Response" policy that may implement various additional security and communication management functions, before transmitting the SOAP response to the client device in step 811.

Figure 9:
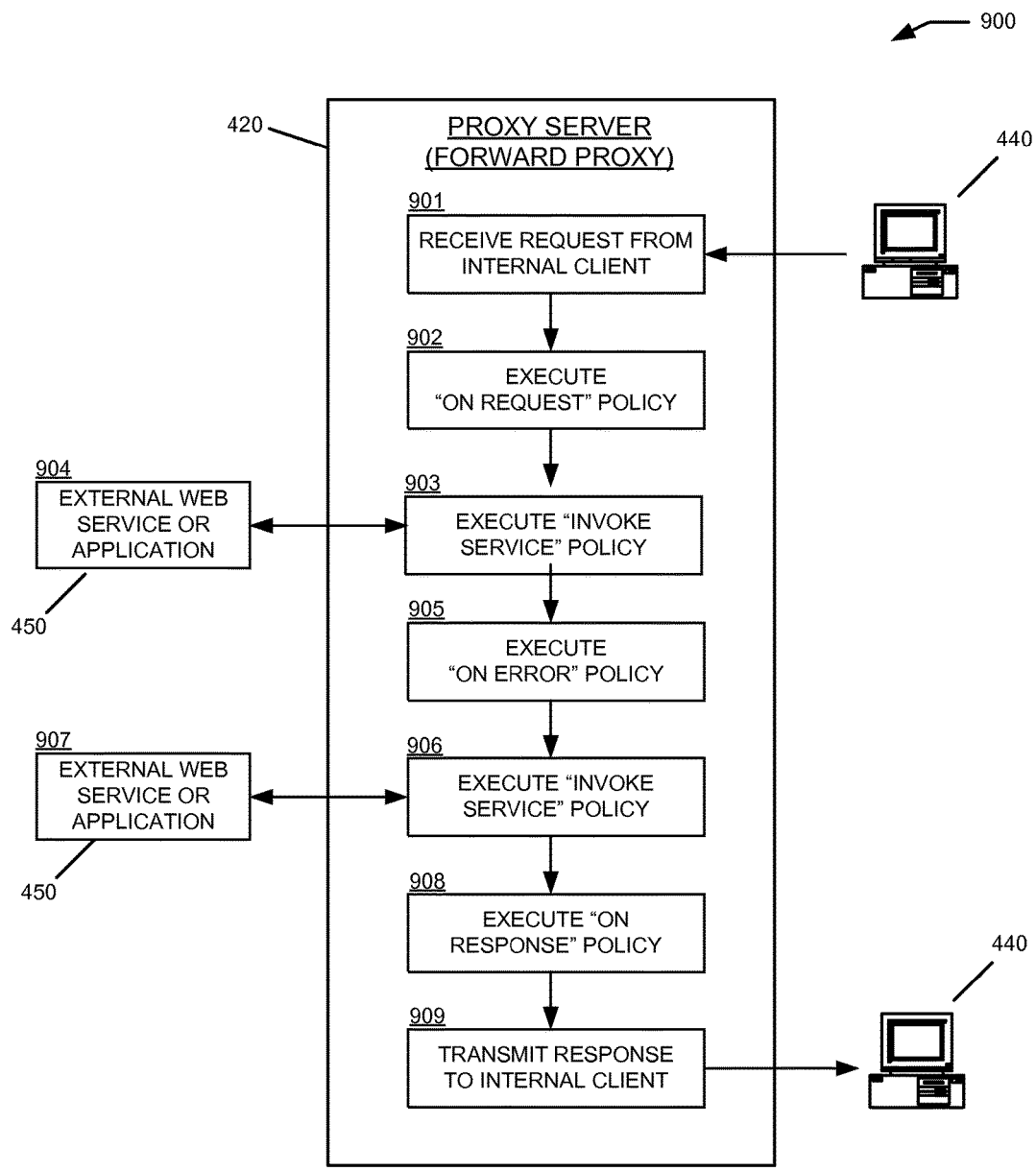
FIG. 9 is a flow diagram illustrating an end-to-end processing flow of a web service or application request sent from an internal client device to an external web service or application, according to one or more embodiments of the present invention.

Referring now to FIG. 9, another example diagram is shown of an end-to-end processing flow of a request for web resources sent from an internal client device 440 to an external web service or application 450. As in the previous example, the execution of the processing flow in this example may be performed by the proxy server 420, along with various other components in the computing environment 400 as described above. In this example, the initial message request from a client device 440 in the internal computer network 460, intended for an external web service or application 450, and thus the proxy server 420 may operate in forward proxy mode.

As discussed above, the end-to-end processing flow diagram 900 in this example may be controlled by a predetermined policy model that defines the specific processing points (or assertions) and the specific policies that should be executed by the proxy server 420 at each processing point during an end-to-end processing flow. In this example, the web request is received from the client device 440 at step 901. In step 902, the proxy server 420 may execute one or more "On Request" policies identified within the policy model that controls the processing of this request. After executing any "On Request" policies, the proxy server 420 may execute one or more "On Invoke" policies in step 903 to implement various security and communication management functions, before transmitting the request to the external web service or application 450 in step 904. In this example, the proxy server 420 identifies an error that has occurred during the end-to-end processing flow, such as an error received from external web service or application 450 or an error occurring within the processing performed by the proxy server 420. Therefore, in step 905, the proxy server 420 may execute one or more "On Error" policies to implement various security functions, analyses, and error handling. In this case, the "On Error" policies may instruct the proxy server 420 to perform additional message processing before retransmitting the request back to the external web service or application 450. Accordingly, the proxy server 420 may re-execute the "On Invoke" policies in step 906 after the "On Error" policies have been applied, and then retransmit the request to the external web service or application 450 in step 907. In step 908, after receiving the response from the backend web service or application 450, the proxy server 420 may execute an "On Response" policy that may implement various additional security and communication management functions, before transmitting the response to the internal client device 440 in step 909.

As the above examples illustrate, various embodiments described herein may support dynamic policy models in which different security policies and other communication management policies may be applied, within a DMZ or other logical or physical subnetwork, at various different processing points throughout the end-to-end processing flow of the message. This dynamic policy model framework may be used to build and implement additional security to prevent attacks from malicious external computing systems, and may implement additional types of security policies that might be not possible or preferable within the last mile security infrastructure (e.g., within the backend web services/applications 430). Additionally, robust authentication and authorization systems may be implemented using the dynamic policy model described herein, such as token translation and/or single-sign-on access control systems. For instance, a client device 410 may authenticate via a username/password or other user credentials, and a predetermined end-to-end processing flow may execute within the proxy server 420 that performs token retrieval and validation from trusted authentication/authorization services within the internal network 460, in order to retrieve or generate various different access tokens of different types (e.g., Kerberos tokens, SPNEGO tokens, username tokens, NTLM tokens, SAML tokens, etc.). Therefore, after the user provides one set of valid credentials and is successfully authentication and authorized, the various policy models within the proxy server 420 may be used to implement a single-sign-on access control system by retrieving or generating the corresponding token type for the various different backend web services/applications 430 subsequently accessed by the user.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums or memory devices, such as CD-ROMs or other type of optical disks, floppy diskettes, ROMs, RAMs, EPROMs, EEPROMs, magnetic or optical cards, flash memory, or other types of machine-readable mediums or memory devices suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of processing messages transmitted between computer networks, the method comprising:
   receiving a first message from a client device at a proxy server within a subnetwork of an internal computer network, the proxy server exposing a set of web applications or services executing on one or more back-end computer servers of the internal computer network to an external computer network, wherein the proxy server is implemented on one or more computer servers separate from the external computer network and separate from back-end computer servers of the internal computer network executing the set of web applications or services of the internal computer network;
   determining that the first message is an individual message within an application processing flow that comprises a plurality of bi-directional messages between the client device and one or more computer servers;
   determining whether the client device from which the first message was received is (a) an internal client device operating within the internal computer network, or (b) an external client device operating within the external computer network;
   analyzing the first message from the client device to determine whether or not the first message is a response to a previous request;
   determining whether the application processing flow containing the first message is (a) for a proxy application or (b) for a virtual application, based on whether the first message was received from an internal client device or an external client device, and based on whether or not the first message is a response to a previous request;
   configuring the proxy server to operate either as (a) a forward proxy server, or (b) a reverse proxy server, based on the determination that the client device of the processing flow is either for an virtual application or for a proxy application, wherein said configuring comprises:
   (i) in response to determining that (a) the application processing flow is for a proxy application, configuring the proxy server to operate in forward proxy mode; or
   (ii) in response to determining that (b) the application processing flow is for a virtual application, configuring the proxy server to operate in reverse proxy mode;
   wherein the proxy server is configured to implement a first set of security protocols for processing messages in when operating in forward proxy mode, and a second different set of security protocols for processing messages in when operating in reverse proxy mode;
   determining a current point for the first message within the application processing flow;
   selecting a policy for processing the first message from a plurality of policies for processing messages within the proxy server, wherein the selection is based on both (a) whether the proxy server is configured to operate in forward proxy mode or reverse proxy mode, and (b) the current point in the application processing flow;
   processing the first message in accordance with the selected policy; and
   after processing the first message, transmitting the first message to a destination.

2. The method of claim 1, wherein the proxy server includes a security proxy, and wherein the selected policy comprises machine-executable code that invokes one or more web services security policies.

3. The method of claim 1, wherein the one or more computer servers on which the proxy server is implemented operate within a physical subnetwork of the internal computer network.

4. The method of claim 1, wherein the one or more computer servers on which the proxy server is implemented are configured to executed a proxy server application within a logical subnetwork of the internal computer network.

5. The method of claim 1, wherein determining the current point for the first message within the processing flow comprises:
   determining that an error has occurred during the application processing flow for the first message; and
   wherein selecting the policy for processing the first message is based on the determination that the error has occurred.

6. The method of claim 1, further comprising:
   receiving one or more user credentials associated with the first message, wherein the first message corresponds to a request from the client device to access a first web service; and
   authenticating, using the user credentials, a first user associated with the request.

7. The method of claim 6, further comprising:
   determining that an authentication token of a first token type is required to access the first web service;
   retrieving a first authentication token from a web service of the internal computer network, wherein the first authentication token is of the first token type and is associated with the first user; and using the first authentication token to access the first web service in accordance with the request.

8. The method of claim 1, further comprising:
executing an OnRequest( ) an OnInvoke( ) an OnResponse( ) or an onError( ) method based on the determined current point in the application processing flow.

9. The method of claim 1, wherein the first message is sent from an external client device to a back-end computer server of the internal computer network,
   wherein determining that the client device of the application processing flow is either an internal client device or an external client device comprises determining that an original message of the application processing flow was a request from an internal client device to a back-end computer server of the external computer network, and
   wherein configuring the proxy server to operate in either forward proxy mode or in reverse proxy mode comprises configuring the proxy server to operate in forward proxy mode in response to determining that the original message of the application processing flow was a request from an internal client device to a back-end computer server of the external computer network.

10. The method of claim 1, wherein the first message is sent from an internal client device to a back-end computer server of the external computer network,
    wherein determining that the client device of the application processing flow is either an internal client device or an external client device comprises determining that an original request of the application processing flow was a request from an external client device to a back-end computer server of the internal computer network, and
    wherein configuring the proxy server to operate either in forward proxy mode or in reverse proxy mode comprises configuring the proxy server to operate in reverse proxy mode in response to determining that the original message of the application processing flow was a request from an external client device to a back-end computer server of the internal computer network.

11. The method of claim 1, further comprising:
    determining that the first message corresponds to a request for a first resource exposed by a first Representational State Transfer (REST) web service within the proxy server;
    in response to determining that the first resource is exposed by the first REST web service, invoking the first REST web service within the proxy server; and
    during execution of the first REST web service within the proxy server, invoking a second REST web service within a computer server in the internal computer network,
    wherein the first REST web service within the proxy server exposes a plurality of resources, including at least one resource configured to invoke the second REST web service, and including at least one resource configured to invoke a third REST web service exposed by a different computer server in the internal computer network.

12. The method of claim 1, further comprising:
    determining that the first message corresponds to a request for a first resource exposed by a first Representational State Transfer (REST) web service within the proxy server;
    in response to determining that the first resource is exposed by the first REST web service, invoking the first REST web service within the proxy server; and
    during execution of the first REST web service within the proxy server, invoking a second REST web service within a computer server in the internal computer network,
    wherein the second REST web service exposes a plurality of resources, and wherein the first REST web service within the proxy server exposes a subset of the plurality of resources exposed by the second REST web service.

13. The method of claim 1, wherein selecting the policy for processing the first message and processing the first message in accordance with the selected policy, comprises either:
    in response to determining that the proxy server is configured to operate in forward proxy mode, selecting and applying one or more service-level policies for processing the first message, or
    in response to determining that the proxy server is configured to operate in reverse proxy mode, selecting and applying one or more operation-level policies for processing the first message.

14. A system comprising one or more computer servers configured to implement a proxy server, the system comprising:
    at least one processing unit comprising one or more processors; and
    memory coupled with and readable by the at least one processing unit and storing therein a set of instructions which, when executed by the at least one processing unit, causes the at least one processing unit to:
    receive a first message from a client device, wherein the one or more computer servers implementing the proxy server are configured to operate within a subnetwork of an internal computer network, and to expose a set of web applications or services executing on one or more back-end computer servers of the internal computer network to an external computer network, wherein one or more computer servers implementing the proxy server are separate from the external computer network and separate from back-end computer servers of the internal computer network executing the set of web applications or services of the internal computer network;
    determine that the first message is an individual message within an application processing flow that comprises a plurality of bi-directional messages between the client device and the one or more computer servers implementing the proxy server;
    determine whether the client device from which the first message was received is (a) an internal client device operating within the internal computer network, or (b) an external client device operating within the external computer network;
    analyze the first message from the client device to determine whether or not the first message is a response to a previous request;
    determine whether the application processing flow containing the first message is (a) for a proxy application or (b) for a virtual application, based on whether the first message was received from an internal client device or an external client device, and based on whether or not the first message is a response to a previous request;
    configure the proxy server to operate either as (a) a forward proxy server, or (b) a reverse proxy server, based on a determination that the client device of the processing flow is either for an virtual application or for a proxy application, wherein said configuring comprises:
(i) in response to determining that (a) the application processing flow is for a proxy application, configuring the proxy server to operate in forward proxy mode; or
(ii) in response to determining that (b) the application processing flow is for a virtual application, configuring the proxy server to operate in reverse proxy mode;
wherein the proxy server is configured to implement a first set of security protocols for processing messages in when operating in forward proxy mode, and a second different set of security protocols for processing messages in when operating in reverse proxy mode;
determine a current point for the first message within the application processing flow;
select a policy for processing the first message from a plurality of policies for processing messages, wherein the selection is based on both (a) whether the proxy server is configured to operate in forward proxy mode or reverse proxy mode, and (b) the current point in the application processing flow;
process the first message in accordance with the selected policy; and
after processing the first message, transmit the first message to a destination.

15. The system of claim 14, the memory storing therein further instructions which, when executed by the processing unit, causes the processing unit to:
determine that the first message invokes or is part of one or more Simple Object Access protocol (SOAP) operations within a SOAP virtual service of the internal computer network;
select the policy for processing the first message based on the determined SOAP operations and the SOAP virtual service; and
after processing the first message in accordance with the selected policy, invoke the determined one or more SOAP operations using data within the first message.

16. The system of claim 14, the memory storing therein further instructions which, when executed by the processing unit, causes the processing unit to:
determine that the first message corresponds to one or more Hypertext Transfer Protocol (HTTP) methods associated with a Representational State Transfer (REST) virtual service or a virtual web application of the internal computer network;
select the policy for processing the first message based on the determined HTTP methods and the REST virtual service or virtual web application; and
after processing the first message in accordance with the selected policy, invoke the determined one or more HTTP methods using data within the first message.

17. The system of claim 14, wherein selecting the policy for processing the first message and processing the first message in accordance with the selected policy, comprises either:
in response to determining that the proxy server is configured to operate in forward proxy mode, selecting and applying one or more service-level policies for processing the first message, or
in response to determining that the proxy server is configured to operate in reverse proxy mode, selecting and applying one or more operation-level policies for processing the first message.

18. A non-transitory computer-readable memory comprising a set of instructions stored therein which, when executed by one or more processors, causes the one or more processors to:
receive a first message from a client device at a proxy server implemented on one or more computer servers configured to operate within a subnetwork of an internal computer network, the proxy server exposing a set of web applications or services executing on one or more back-end computer servers of the internal computer network to an external computer network, wherein one or more computer servers implementing the proxy server are separate from the external computer network and separate from back-end computer servers of the internal computer network executing the set of web applications or services of the internal computer network;
determine that the first message is an individual message within an application processing flow that comprises a plurality of bi-directional messages between the client device and the one or more computer servers;
determine whether the client device from which the first message was received is (a) an internal client device operating within the internal computer network, or (b) an external client device operating within the external computer network;
analyze the first message from the client device to determine whether or not the first message is a response to a previous request;
determine whether the application processing flow containing the first message is (a) for a proxy application or (b) for a virtual application, based on whether the first message was received from an internal client device or an external client device, and based on whether or not the first message is a response to a previous request;
configure the proxy server to operate either as (a) a forward proxy server, or (b) a reverse proxy server, based on the determination that the client device of the processing flow is either for an virtual application or for a proxy application, wherein said configuring comprises:
(i) in response to determining that (a) the application processing flow is for a proxy application, configuring the proxy server to operate in forward proxy mode; or
(ii) in response to determining that (b) the application processing flow is for a virtual application, configuring the proxy server to operate in reverse proxy mode;
wherein the proxy server is configured to implement a first set of security protocols for processing messages in when operating in forward proxy mode, and a second different set of security protocols for processing messages in when operating in reverse proxy mode
determine a current point for the first message within the application processing flow;
select a policy for processing the first message from a plurality of policies for processing messages, wherein the selection is based on both (a) whether the proxy server is configured to operate in forward proxy mode or reverse proxy mode, and (b) the current point in the application processing flow;
process the first message in accordance with the selected policy; and
after processing the first message, transmit the first message to a destination.

19. The computer-readable memory of claim 18, comprising further instructions stored therein which, when executed by the processor, causes the processor to:
- determine that the first message invokes or is part of one or more Simple Object Access protocol (SOAP) operations within a SOAP virtual service of the internal computer network;
- select the policy for processing the first message based on the determined SOAP operations and the SOAP virtual service; and
- after processing the first message in accordance with the selected policy, invoke the determined one or more SOAP operations using data within the first message.

20. The computer-readable memory of claim 18, comprising further instructions stored therein which, when executed by the processor, causes the processor to:
- determine that the first message corresponds to one or more Hypertext Transfer Protocol (HTTP) methods associated with a Representational State Transfer (REST) virtual service or a virtual web application of the internal computer network;
- select the policy for processing the first message based on the determined HTTP methods and the REST virtual service or virtual web application; and
- after processing the first message in accordance with the selected policy, invoke the determined one or more HTTP methods using data within the first message.

* * * * *